(12) United States Patent
Ito et al.

(10) Patent No.: US 6,426,604 B1
(45) Date of Patent: Jul. 30, 2002

(54) POWER WINDOW CONTROLLING DEVICE

(75) Inventors: Takeshi Ito; Masaru Kato, both of Yokohama (JP)

(73) Assignee: Jidosha Denki Kogyo Kabushiki Kaisha, Kanagawa (JP)

( * ) Notice: Subject to any disclaimer, the term of this patent is extended or adjusted under 35 U.S.C. 154(b) by 0 days.

(21) Appl. No.: 09/575,452

(22) Filed: May 22, 2000

(30) Foreign Application Priority Data

May 21, 1999 (JP) .......................................... 11-141422

(51) Int. Cl.[7] ................................................ H02P 7/00
(52) U.S. Cl. ...................... 318/466; 318/282; 318/466; 318/461; 49/26; 49/28; 160/293.1
(58) Field of Search ................................. 318/266, 282, 318/461, 466, 468; 49/26, 28; 160/291, 293.1

(56) References Cited

U.S. PATENT DOCUMENTS

| | | | | |
|---|---|---|---|---|
| 5,410,226 A | * | 4/1995 | Sekiguchi et al. | 318/266 |
| 5,530,329 A | * | 6/1996 | Shigematsu et al. | 318/469 |
| 5,650,698 A | * | 7/1997 | Ito et al. | 318/282 |
| 5,754,017 A | * | 5/1998 | Tsuge et al. | 318/286 |
| 5,774,046 A | * | 6/1998 | Ishihara et al. | 340/438 |
| 5,977,732 A | * | 11/1999 | Matsumoto | 318/283 |
| 6,034,497 A | * | 3/2000 | Tamagawa et al. | 318/466 |
| 6,100,658 A | * | 8/2000 | Kume et al. | 318/286 |

* cited by examiner

*Primary Examiner*—Robert E. Nappi
*Assistant Examiner*—Rina I. Duda
(74) *Attorney, Agent, or Firm*—Sughrue Mion, PLLC

(57) ABSTRACT

A power window controlling device, which detects an obstruction-caught state without misunderstanding even if the electric potential at the power source drops abruptly, which comprises switches, an electric motor, a drive system, a drive controller, a rotation sensor, a motor speed calculating device, a source voltage detecting circuit, a data signal generating device and a motor torque calculator. The motor torque calculator calculates correcting data of motor torque on basis of a correcting data signal given from the data signal generating device and a rotational speed signal of the motor given from the motor speed calculator, and compares the correcting data of the motor torque with the predetermined criterion value in a case where the electric potential of the power source changes.

3 Claims, 16 Drawing Sheets

```
  TIMER
INTERRUPTION
      ↓
TAR (H) = TAR (H) + 1     ~400
      ↓
TBR (H) = TBR (H) + 1     ~401
      ↓
TAF (H) = TAF (H) + 1     ~402
      ↓
TBF (H) = TBF (H) + 1     ~403
      ↓
    RETURN
```

DETECTION OF TRAVELLING DIRECTION

|  | EDGE IN PULSE SIGNAL A | | EDGE IN PULSE SIGNAL B | |
|---|---|---|---|---|
|  | PULSE SIGNAL B = "L" | PULSE SIGNAL B = "H" | PULSE SIGNAL A = "L" | PULSE SIGNAL B = "H" |
| POSITIVE GOING EDGE | OPENING | CLOSING | CLOSING | OPENING |
| NEGATIVE GOING EDGE | CLOSING | OPENING | OPENING | CLOSING |

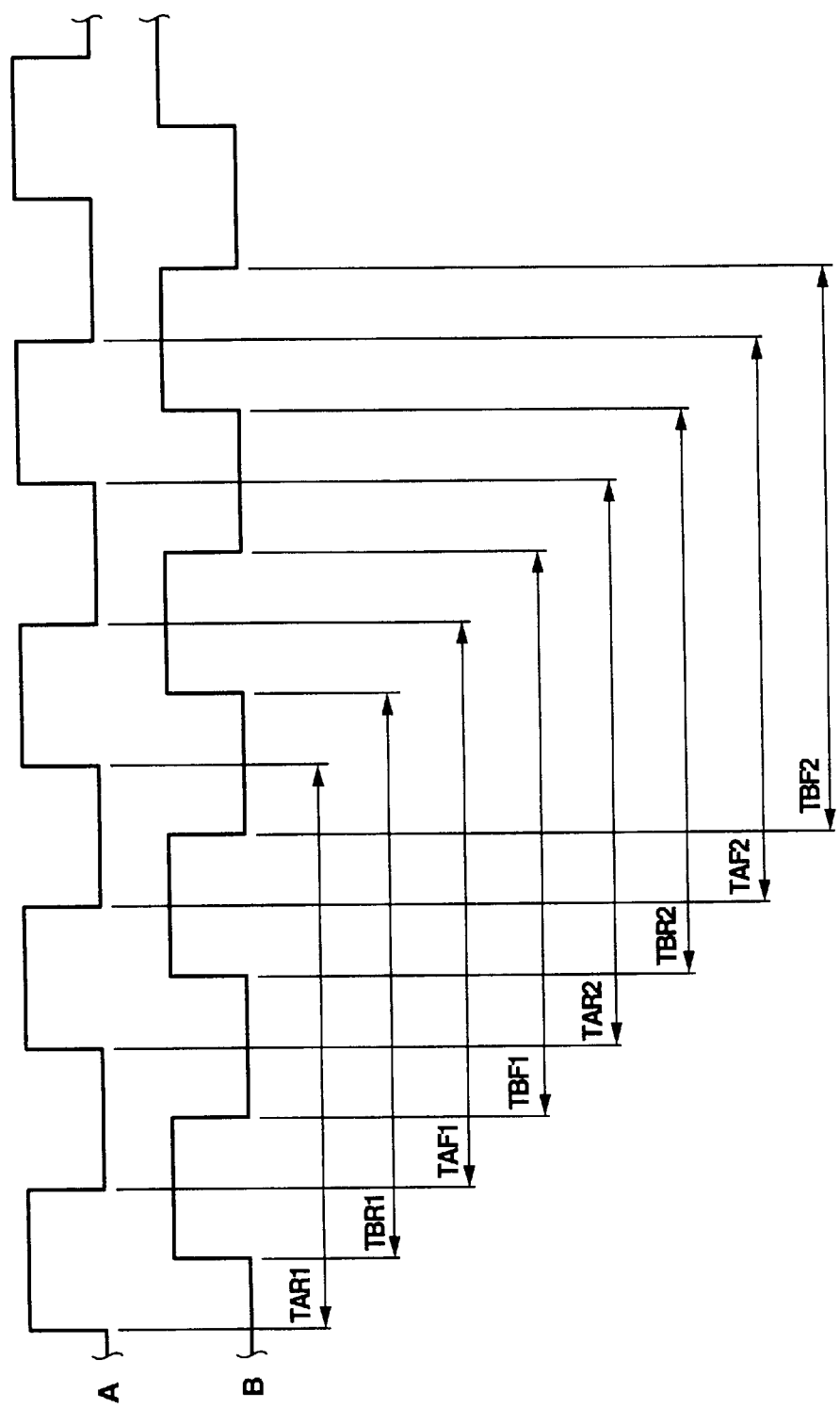

POWER WINDOW CONTROLLING DEVICE

BACKGROUND OF THE INVENTION

1. Field of the Invention

This invention relates to a power window controlling device for driving a window glass of motor vehicles and, more particularly to an improved device which is possible to reversely drive the window glass in the opening direction at the time when torque data of the driving motor of the window glass increases over the predetermined value while the window glass is traveling a predetermined distance in the closing direction. In the power window controlling device according to this invention, when the electric potential of the power source drops, the fall of potential is detected and the torque data of the electric motor is corrected according to the lowered electric potential.

2. Description of the Prior Art

As the power window controlling device for driving the window glass of the motor vehicle, a device is well known which has an electric motor of which armature shaft is operatively connected with the window glass through a window regulator. The armature shaft of the electric motor is secured with a rotation sensor to detect the rotation thereof. The rotation sensor is composed of a magnet attached on the armature shaft of the motor and a Hall element disposed around about the magnet. THe magnet is rotated together with the armature shaft, whereby a pulse-shaped detection signal (Hall voltage) is generated from the Hall element, therefore the number of revolutions (rotational speed) of the armature shaft is calculated by detecting pulse duration of the detection signal by the controller. Heretofore, the controlling device is known which is so designed as to prevent an obstruction to be caught between the window glass and the sash by recognizing the obstruction to be caught in accordance with lowering of the detected rotational speed of the electric motor and actuating the window glass in the reverse direction.

However, in the aforementioned power window controlling device the rotational speed of the electric motor is gradually lowered if the electric potential of the power source (battery) abruptly drops owing to actuation of the load such as lighting equipment and so, accordingly there is a problem in that there is the possibility that the controller may actuate the window glass in the reverse direction by misunderstanding the obstruction to be caught according to the lowering of the rotational speed of the electric motor.

SUMMARY OF THE INVENTION

This invention is made in view of the above-mentioned problem of the prior art, and it is an object to provide a power window controlling device which is not so easily misunderstand the obstruction to be caught even if the electric potential of the power source drops abruptly.

In order to accomplish the aforementioned object, the power window controlling device according to this invention is provided with a motor speed calculating means connected to the rotation sensor for calculating the rotational speed of the electric motor on basis of the rotation signal generated from the rotation signal generator of the rotation sensor and generating a rotational speed signal, a source voltage detecting circuit connected to the power source for detecting electric potential of the power source and converting the electric potential into a voltage signal, a data signal generating means connected to the source voltage detecting circuit for generating a correcting data signal obtained by including correction of time constant nearly equal to time constant TO of the electric motor to the voltage signal given by the source voltage detecting circuit, and a motor torque calculating means for calculating correcting data of torque of the electric motor according to the correcting data signal given by the data signal generating means and the rotational speed signal of the electric motor given by the motor speed calculating means, and for supplying a descending demand signal to the drive controlling means to lower the window glass at the time when the correcting data of the torque of the electric motor increases over a predetermined criterion value while the drive controlling means is supplying the ascending drive signal to the driving means in response to the ascending command signal generated from the CLOSE-switch.

In this invention, the electric potential of the power source is detected and converted into the voltage signal by the source voltage detecting means, the correcting data signal obtained by including correction of time constant nearly equal to time constant TO of the electric motor to the voltage signal given by the source voltage detecting circuit is generated by the data signal generating means, and the correcting data of torque of the electric motor is calculated by the motor torque calculating means according to the correcting data signal given by the voltage correcting means and the rotational speed signal of the electric motor given by the motor speed calculating means, and the descending demand signal is supplied to the drive controlling means to lower the window glass by the motor torque calculating means at the time when the correcting data of the torque of the electric motor increases over the predetermined criterion value. Namely, the correcting data of the torque of the motor is calculated in the case where the voltage of the power source changes, and the obstruction-caught state is detected by comparing the correcting data with the criterion value, therefore it is prevented to misunderstand the obstruction to be caught between the window glass and the sash.

BRIEF DESCRIPTION OF THE DRAWINGS

FIG. 18 is a time chart illustrating the control of the timer in the power window controlling device according to the third embodiment of this invention.

DESCRIPTION OF PREFERRED EMBODIMENT

The power window controlling device according to an embodiment of this invention will be described below on basis of FIG. 1 to FIG. 14.

Figure 1:
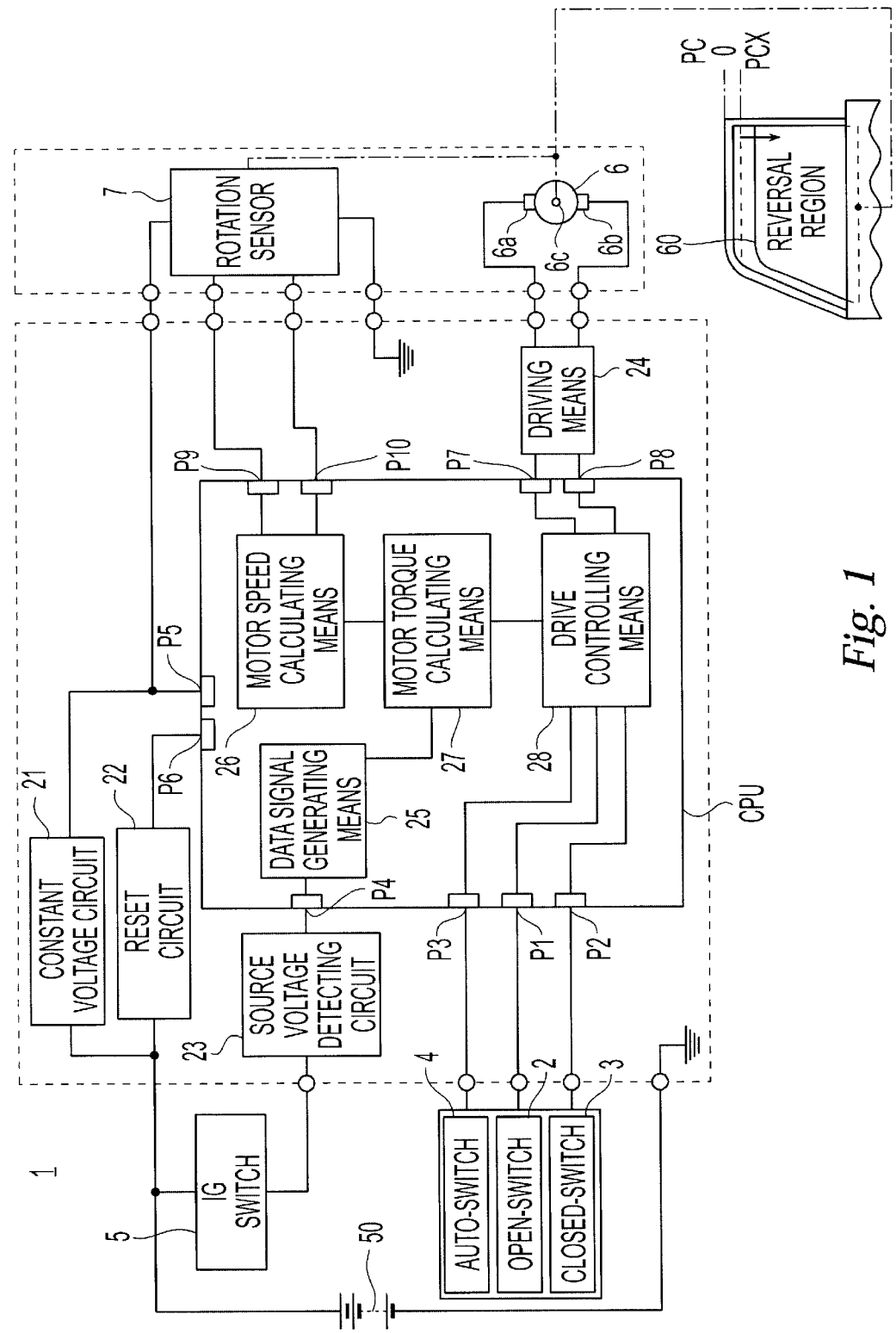
FIG. 1 is a block diagram of the power-window controlling device according to the first embodiment of this invention.

The power window controlling device 1, as shown in FIG. 1, is mainly composed of an OPEN-switch 2, a CLOSE-switch 3, an AUTO (one-touch)-switch 4, an ignition switch (IG switch) 5, a power source 50, an electric motor 6, a rotation sensor 7 and a control unit 20, and the control unit 20 is provided with a constant voltage circuit 21, a reset circuit 22, a source voltage detecting circuit 23, a microcomputer CPU and a driving means 24.

The OPEN-switch 2 generates a descending command signal according to on-operation thereof. THe descending command signal generated by the OPEN-switch 2 is given to a first switch input port P1 of the microcomputer CPU provided in the control unit 20 through a voltage clamp circuit (not shown).

The CLOSE-switch 3 generates an ascending command signal according to on-operation thereof. The ascending command signal generated by the CLOSE-switch 3 is given to a second switch input port P2 of the microcomputer CPU in the control unit 20 through the voltage clamp circuit (not shown).

The AUTO-switch 4 generates an automatic action command signal according to on-operation thereof. The automatic action command signal generated by the AUTO-switch 4 is given to a third switch input port P3 of the microcomputer CPU in the control unit 20 through the voltage clamp circuit (not shown).

The ignition switch 5 is connected to the power source 50 at one side, and connected to the source voltage detecting circuit 23 provided in the control unit 20 at another side. The ignition switch 5 gives the electric potential of the power source 50 to the source voltage detecting circuit 23 according to on-operation thereof.

The source voltage detecting circuit 23 is connected to the ignition switch 5 at one side, and connected to a voltage detection port P4 of the microcomputer CPU at another side. The electric potential at the power source 50 drops owing to actuation of the lighting equipment such as a head light or so, a defogger, an air conditioner and so on. The source voltage detecting circuit 23 converts the electric potential of the power source 50 into a voltage signal. The fluctuating voltage signal converted by the source voltage detecting circuit 23 is given to the voltage detection port P4 of the microcomputer CPU. The fluctuating voltage signal is taken into a data signal generating means 25 housed in the microcomputer CPU.

The constant voltage circuit 21 is connected to the ignition switch 5 at one side and connected to a regulator port P5 of the microcomputer CPU at another side. The constant voltage circuit 21 give predetermined microcomputer-driving voltage to a regulator port P5 of the microcomputer CPU by switching on the ignition switch 5.

The reset circuit 22 is connected to the power source 50 at one side and connected to a reset port P6 of the microcomputer CPU at another side. The reset circuit 22 resets the microcomputer CPU into the initial state by making the reset port P6 of the microcomputer CPU into low level for a predetermined period at the time of connecting the control unit 20 with the power source 50.

The driving means 24 is composed of relays, switching transistors and the like, connected respectively to a first output port P7 and a second output port P8 of the microcomputer CPU at one side, and connected respectively to a first brush terminal 6a and a second brush terminal 6b of the electric motor 6 at another side thereof.

The driving means 24 gives voltage on low level to the second brush terminal 6b of the motor 6 and gives voltage in high level to the first brush terminal 6a of the motor 6 from the power source 50 in accordance that the first output port P7 of the microcomputer CPU becomes to high level and the second output port P8 of the microcomputer CPU becomes to low level. Consequently the electric motor 6 is rotated in the forward direction. Contrary to above, the driving means 24 gives voltage on low level to the first brush terminal 6a of the motor 6 and gives voltage on high level to the second brush terminal 6b of the motor 6 from the power source 50 in accordance that the first output port P7 of the microcomputer CPU becomes to low level and the second output port P8 of the microcomputer CPU becomes to high level. Consequently the electric motor 6 is rotated in the reverse direction.

In the electric motor 6, an armature shaft 6c of an armature (not shown) is connected with a window glass 60 through a window regulator (not shown). When the first brush terminal 6a is given with voltage on high level and the second brush terminal 6b is given with voltage on low level, the armature shaft 6c of the motor 6 is rotated forwardly, thereby moving the window glass 60 in the opening (descending) direction. To the contrary, if the second brush terminal 6b is given with voltage on high level and the first brush terminal 6a is given with voltage on low level, the armature shaft 6c of the motor 6 is rotated reversely, thereby moving the window glass 60 in the closing (ascending) direction. The armature shaft 6c of the electric motor 6. is secured with the rotation sensor 7.

Figure 6:
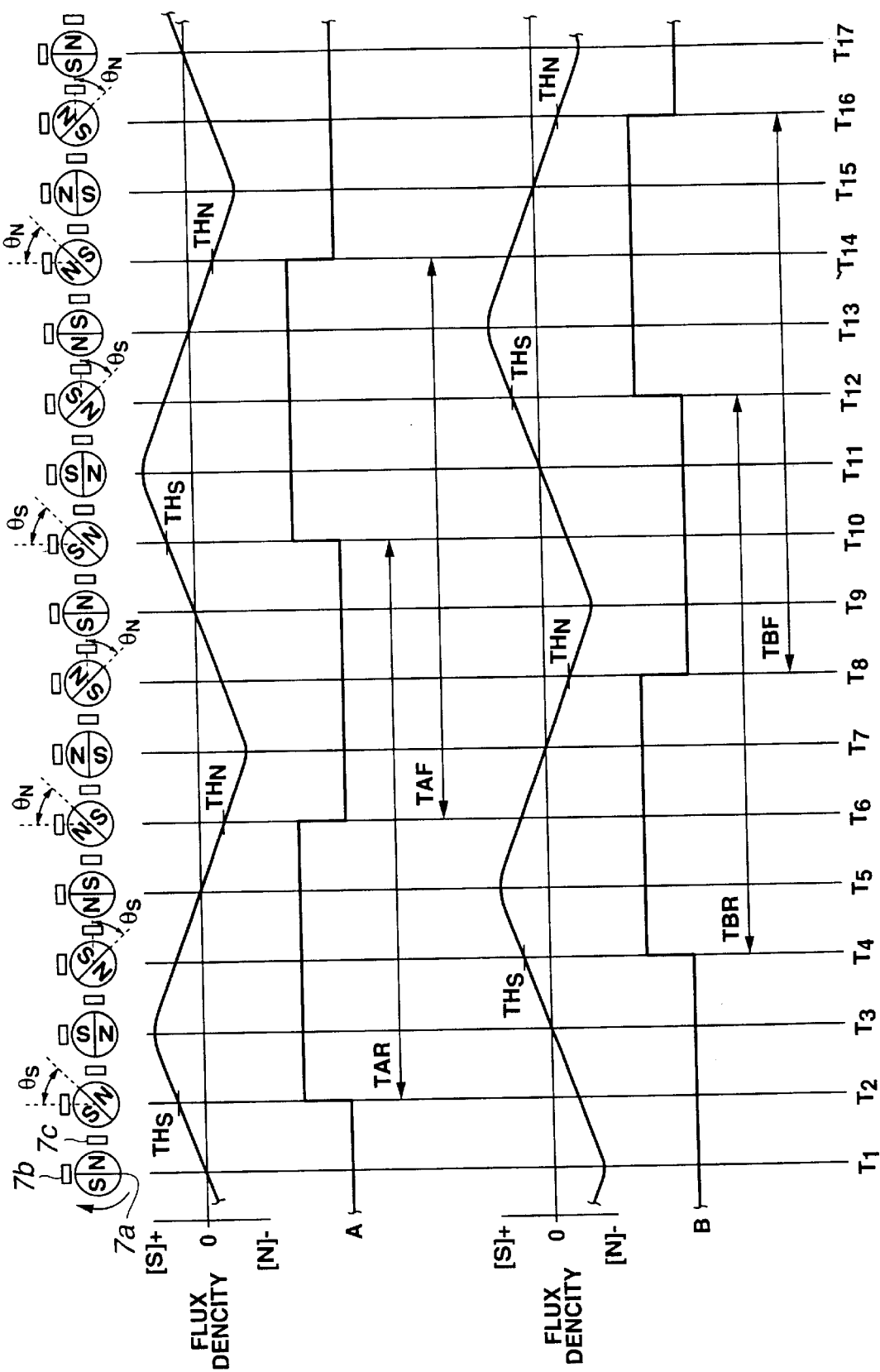
FIGS. 6 and 7 are time charts illustrating the action in the power window controlling device shown in FIG. 1.

The rotation sensor 7 is provided with a rotor 7a, a first signal generator 7b and a second signal generator 7c as shown in FIG.6. The rotor 7a is provided with a magnet oppositely disposed with single north pole and single south pole. The rotor 7a is fixed coaxially on the armature shaft 6c of the electric motor 6 and rotated together with the armature shaft 6c.

The first and second signal generator 7b and 7c are disposed in the periphery of the rotor 7a. The first and second signal generators 7b and 7c are Hall elements, respectively and disposed without touching the rotor 7a. The first signal generator 7b and the second signal generator 7c are disposed distantly from each other by an angle of 90° on the circumference of the rotor 7a.

The first signal generator 7b is connected to the constant voltage circuit 21 at a power terminal thereof, connected to a first rotation detection port P9 of the microcomputer CPU at a Hall voltage output terminal thereof, and grounded at an earth terminal thereof. The first signal generator 7b has threshold value THs against the south pole of the magnet and threshold value $TH_N$ against the north pole of the magnet as shown in FIG.6, therefore Hall voltage is generated according to the threshold value THs at the time when the rotor 7a turns to a position making a predetermined angle from a boundary line between north and south poles of the magnet on the side of the south pole, and the Hall voltage disappears according to the threshold value $TH_N$ at the time when the rotor 7a turns to a position making a predetermined angle from the boundary line between north and south poles of the magnet on the side of the north pole.

The second signal generator 7c is connected to the constant voltage circuit 21 at a power terminal thereof, connected to a second rotation detection port P10 of the microcomputer CPU at a Hall voltage output terminal thereof, and grounded at an earth terminal thereof. The second signal generator 7c has threshold value THs against the south pole of the magnet and threshold value $TH_N$ against the north pole of the magnet as shown in FIG. 6 similarly to the first signal generator 7b, therefore Hall voltage is generated according to the threshold value THs at the time when the rotor 7a turns to a position making a predetermined angle from a boundary line between north and south poles of the magnet on the side of the south pole, and the Hall voltage disappears according to the threshold value $TH_N$ at the time when the rotor 7a turns to a position making a predetermined angle from the boundary line between north and south poles of the magnet on the side of the north pole.

In the rotation sensor 7, when the rotor 7a is rotated together with the armature shaft 6c by the forward rotation of the armature shaft 6c, a first pulse signal A is generated from the first signal generator 7b and taken into the first rotation detection port P9 of the microcomputer CPU. Furthermore, a second pulse signal B is generated from the second signal generator 7c with a phase difference of one-fourth period from the first pulse signal B according to the rotation of the armature shaft 6c and the second pulse signal B is taken into the second rotation detection port P10 of the microcomputer CPU.

The microcomputer CPU houses a data signal detecting means 25, a motor speed calculating means 26, a motor torque calculating means 27, a drive controlling means 28, a position counter (not shown) for storing a position of the window glass 60 and a clock (not shown) for clocking, respectively.

When the descending command signal is given into the first switch input port P1, the driving means 24 generates a forward rotational drive signal, gives voltage on low level to the second brush terminal 6b of the electric motor 6 and gives voltage on high level to the first brush terminal 6a of the motor 6 from the power source 50, whereby the window glass 60 becomes to the manually opening state.

Further, in the microcomputer CPU, when the ascending command signal is given to the second switch input port P2, the driving means 24 generates a reverse rotational drive signal, gives voltage on low level to the first brush terminal 6a of the electric motor 6 and gives voltage on high level to the second brush terminal 6b of the motor 6, whereby the window glass 50 becomes to the manually closing state.

When the automatic action command signal is given to the switch input port P3 from the AUTO-switch 4 at the same time the descending command signal is given to the first switch input port P1 according to the on-operation of the OPEN-switch 2, the driving means 24 generates the forward rotational drive signal, voltage on low level is given to the second brush terminal 6b of the electric motor 6 and voltage on high level is given to the first brush terminal 6a of the motor 6 from the power source 50. Furthermore, the driving means 24 continues to generate the forward rotational drive signal even after the OPEN-switch 2 is switched off, and continues to give the voltage on low level to the second brush terminal 6b of the motor 6 and to give the voltage on high level to the first brush terminal 6a of the motor 6 from the power source 50, whereby the window glass 60 becomes to the automatic opening state.

When the automatic action command signal is given to the switch input port P3 from the AUTO-switch 4 at the same time the ascending command signal is given to the second switch input port P2 according to the on-operation of the CLOSE-switch 3, the driving means 24 generates the reverse rotational drive signal, voltage on low level is given to the first brush terminal 6a of the motor 6 and voltage on high level is given to the second brush terminal 6b of the motor 6 from the power source 50. Furthermore, the driving means 24 continues to generate the drive signal even after the CLOSE-switch 3 is switched off, and continues to give the voltage on low level to the first brush terminal 6a of the motor 6 and to give the voltage on low level to the second brush terminal 6b of the electric motor 6 from the power source 50, whereby the window glass 60 becomes to the automatic closing state.

Figure 2:
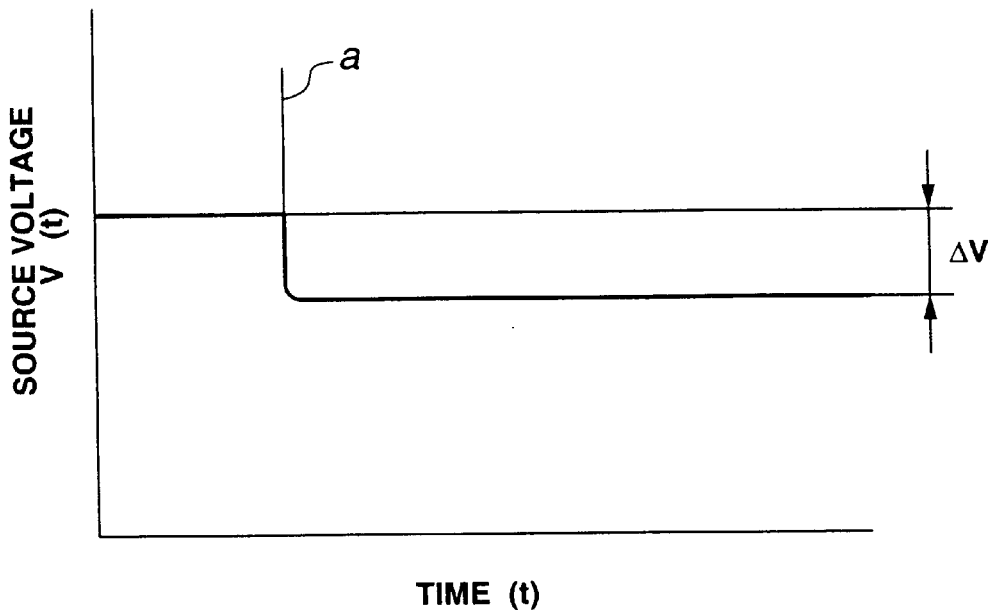
FIGS. 2 to 5 are charts illustrating the control in the power window controlling device shown in FIG. 1.
Figure 3:
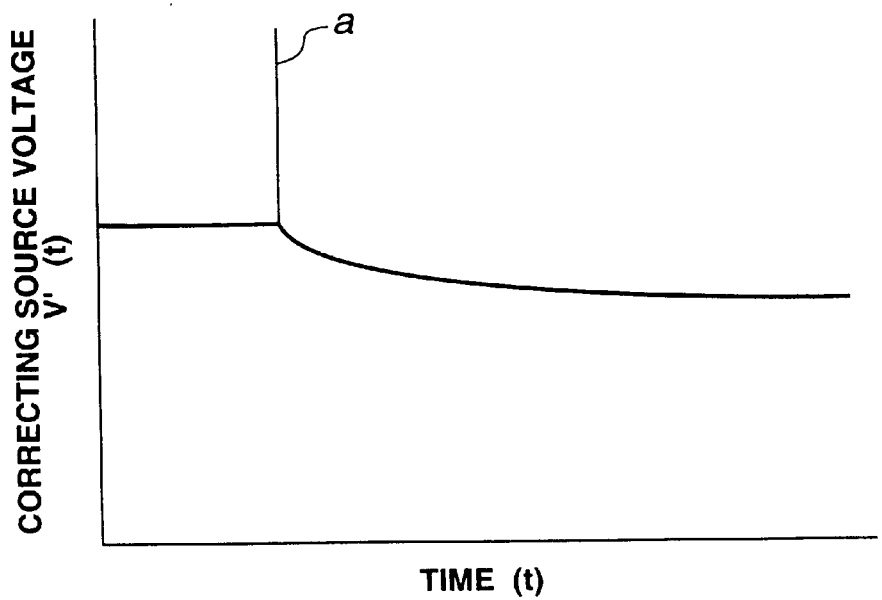
Figure 4:
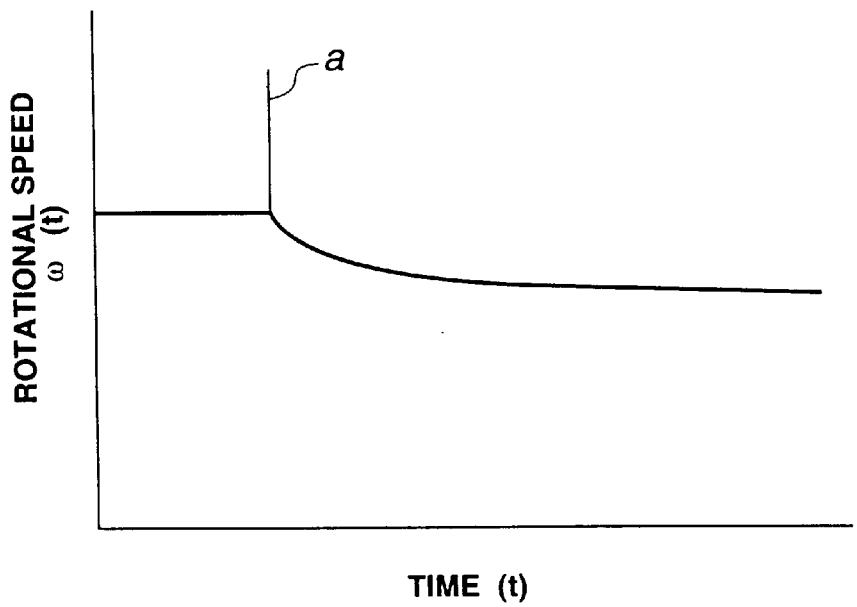

The data signal generating means 25 calculates correcting data to generate the fluctuating voltage signal given by the time constant TO as shown in FIG. 3 when the source voltage detecting circuit 23 detects change $\Delta V$ of voltage at the power source 50 as shown in FIG. 2. The correcting data calculated by the data signal detecting means 25 is used in the motor torque calculating means 27. The time constant TO is selected so as to be nearly equal to the time constant Tm of change in rotational speed of the electric motor 6 at time the voltage of the power source 50 changes as much as $\Delta V$ as shown in FIG. 4.

The motor speed calculating means 26 is an operation means for calculating rotational speed data of the armature shaft 6c of the electric motor 6 by using a free-running counter FRC, first, second, third and fourth timers TAR, TBR, TAF and TBF. The function of the first, second, third and fourth timers TAR, TBR, TAF and TBF are shown on FIG. 6.

The motor torque calculating means 27 calculates torque data TL ($TL = AV(t) - B\omega(t)$, A,B: constant) of the electric motor 6 in accordance with the correcting data given by the data signal detecting means 25 and the rotational speed data of the armature shaft 6c of the motor 6 given from the motor speed calculating means 26.

The drive controlling means 28 has function for processing the ascending command signal given from the OPEN-switch 2, the descending command signal given from the CLOSE-switch 3 and the automatic action command signal given from the AUTO-switch 4, and making the driving means 24 to generate the forward rotational drive signal or the reverse rotational drive signal. Further, the drive controlling means 28 determines the window 50 to catch (pinch) the obstruction if the torque data given by the motor torque calculating means 27 is larger than the predetermined value, and makes the driving means 24 to generate the forward rotational drive signal.

Figures 8, 9:
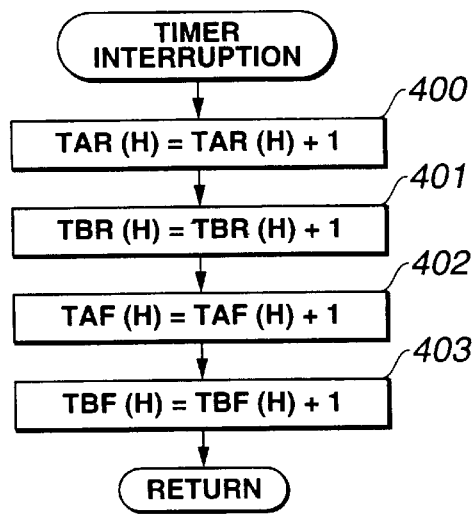
FIG. 8 is a flowchart of the timer interruption in the power window controlling device shown in FIG. 1.
FIG. 9 is an explanation of processing of detecting the moving direction according to pulses in the power window controlling device shown in FIG. 1.

When the free-running counter FRC is counted up synchronously with the clock and the count value amounts to FF (16), the free-running counter FRC is overflowed and reset into "0" count by the following counting. According to the reset of the fee-running counter FRC, timer interruption shown in FIG.8 is execute in the microcomputer CPU. In the timer interruption, the routine is executed, namely increment of the first timer TAR, second timer TBR, third timer TAF and fourth timer TBF is carried out successively in respective steps 400, 401, 402 and 403.

The first timer TAR is a memory of 16 bits for measuring the time required since the positive going edge of the first pulse signal A is generated from the first signal generator 7b of the rotation sensor 7 at time T2 until the succeeding positive going edge of the first pulse signal A is generated from the first signal generator 7b at time T10 after one revolution of the rotor 7a every time the rotor 7a makes one revolution as shown in FIG. 6. The first timer TAR is reset into "0" count after transferring the data into a resistor TO.

The second timer TBR is a memory of 16 bits for measuring the time required since the positive going edge of the second pulse signal B is generated from the second signal generator 7c of the rotation sensor 7 at time T4 until the succeeding positive going edge of the second pulse signal B is generated form the second signal generator 7c at time T12 after one revolution of the rotor 7a every time the rotor 7a makes one revolution as shown in FIG. 6. The second timer TBR is reset into "0" count after transferring the data into the resistor TO.

The third timer TAF is a memory or 16 bits for measuring the time required since the negative going edge of the first pulse signal A is generated form the first signal generator 7b of the rotation sensor 7 at time T6 until the succeeding negative going edge of the first pulse signal A is generated from the first signal generator 7b at time T14 after one revolution of the rotor 7a every time the rotor 7a makes one revolution as shown in FIG. 6. The third timer TAF is reset into "0" count after transferring the data into the resistor TO.

The fourth timer TBF is also a memory of 16 bits for measuring the time required since the negative going edge of the second pulse signal B is generated from the second signal generator 7c of the rotation sensor 7 at time T8 until the succeeding negative going edge of the second pulse signal B is generated from the second signal generator 7c at time T16 after one revolution of the rotor 7a every time the rotor 7a makes one revolution as shown in FIG. 6. The fourth timer TBF is also reset into "0" count after transferring the data into the resistor TO.

The microcomputer CPU recognizes the window glass 60 to move in the opening direction by the forward rotation of the armature shaft 6c of the electric motor 6 in a case where the second pulse signal B is on low level at the time of detecting the positive going edge of the first pulse signal A. As compared with above, the microcomputer CPU recognizes the window glass 60 to move in the closing direction by the reverse rotation of the armature shaft 6c of the motor 6 in a case where the second pulse signal B is on high level at the time of detecting the positive going edge in the first pulse signal A as shown in FIG. 9.

The microcomputer CPU sets count value of a position counter, PC (not shown) into "0" when the window glass 60 is in the full-closed position, and sets count value of the position counter PC into "PCX" when the window glass 60 moves slightly from the full-closed position in the opening direction. The microcomputer CPU defines an automatic reversal-prohibition region in which automatic reversal action of the window glass 60 is not carried out in a range from the point of count value "0" to the point of count value PCX, and further defines an automatic reversal-allowable region in which the automatic reversal action is carried out in a range from the point of count value PCX to the point of count value corresponding to the full-opened position of the window glass 60. Ordinarily the count value of the position counter PC is added at the time of moving the window glass 60 in the opening direction, and subtracted at the time of moving the window glass 60 in the closing direction contrary to above.

If the torque data given from the motor torque calculating means 27 increases over the predetermined value while the driving means 24 generates the reverse rotational drive signal and the window glass 60 is traveling a predetermined distance, the microcomputer CPU makes the driving means 24 to stop the reverse rotational drive signal and generate the forward rotational drive signal through the drive controlling means 28, thereby reversely moving the window glass 60 in the opening direction.

Figure 5:
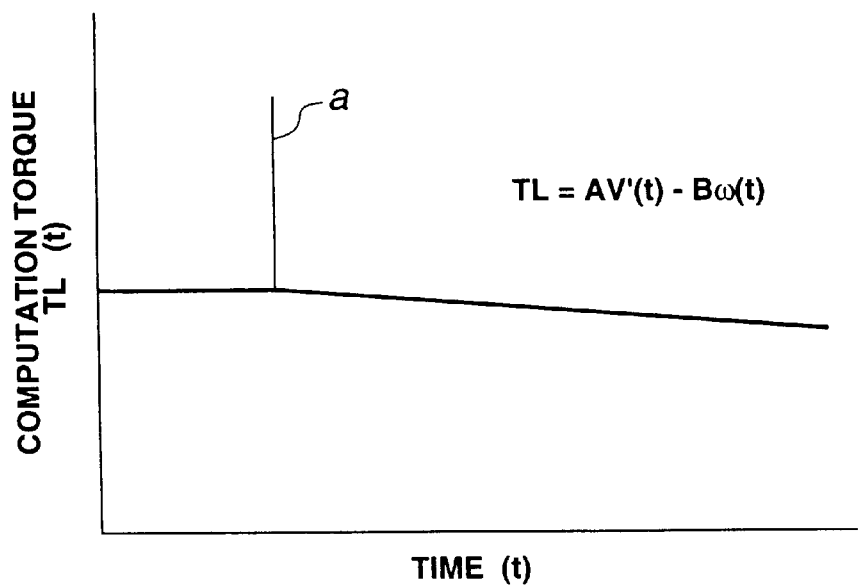

As mentioned above, in the power window controlling device 1 according to this invention, when the voltage at the power source 50 drops to voltage V(t) at time a shown n FIG. 2, the data signal generating means 25 calculates the correcting data (correcting source voltage V'(t)) in accordance with the voltage signal give by the source voltage detecting circuit 23 as shown in FIG. 3. At this time, the rotational speed ω (t) of the electric motor 6 calculated by the motor speed calculating means 26 is lowered corresponding to the voltage drop of the power source 50 as shown in FIG. 4. However, in the microcomputer CPU, the motor torque calculating means 27 calculates computation torque TL(t) on basis of the following formula by using the correcting source voltage V' (t) obtained by the data signal generating means 25 and the rotational speed ω (t) of the motor 6 obtained by the motor speed calculating means 26 as shown in FIG. 5;

$$TL(t)=A\ V'(t)-B\omega(t)$$

Therefore, the computation torque TL(t) is not attended with abrupt change synchronized with the voltage drop of the power source 50. That is, even if the voltage at the power source 50 drops abruptly, the computation torque TL(t) is not lowered so abruptly, therefore, erroneous detection of the obstruction-caught state is never caused so easily.

Figure 10A:
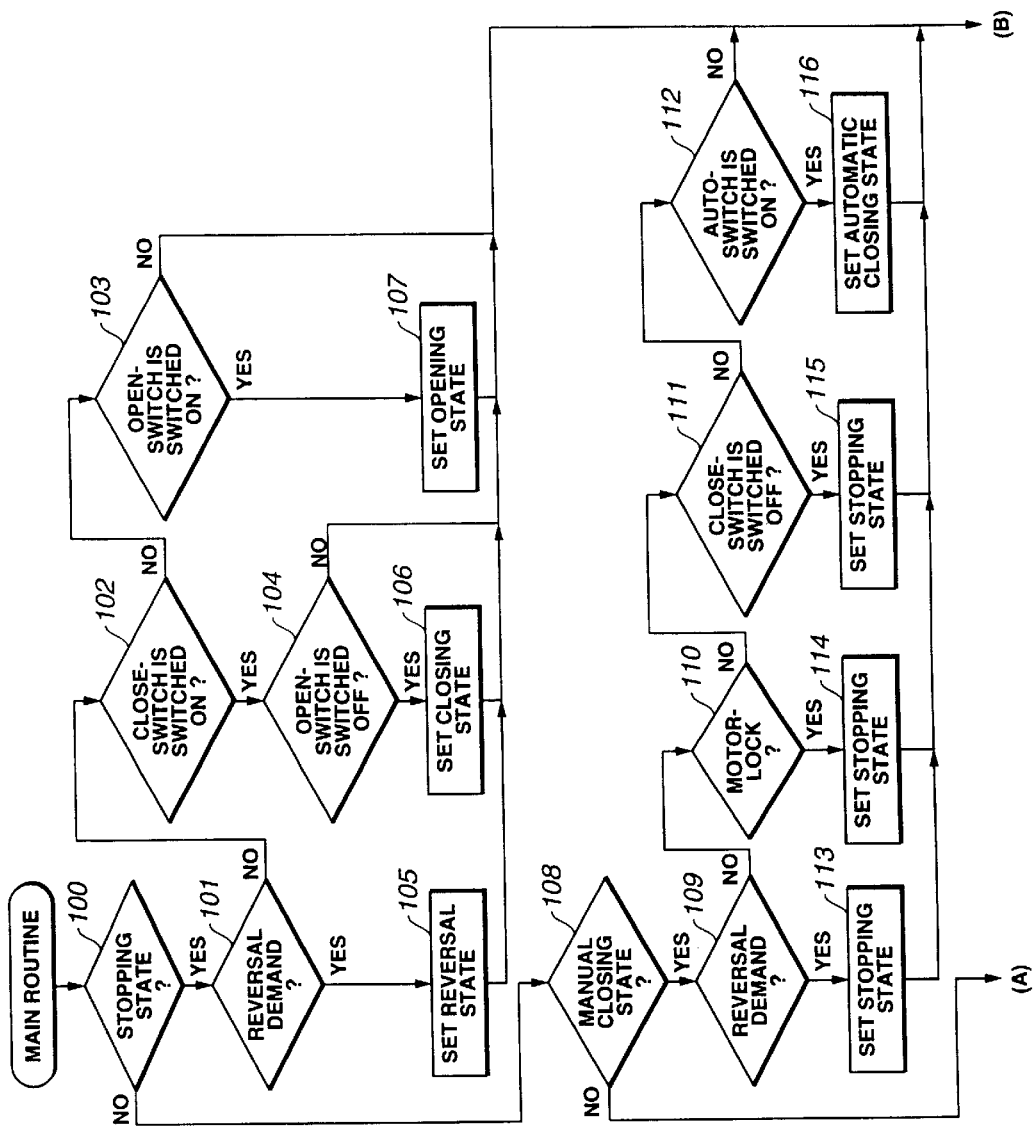
FIGS. 10A and 10B are a flowchart of the mainroutine used for the control in the power window controlling device shown in FIG. 1.
Figure 10B:
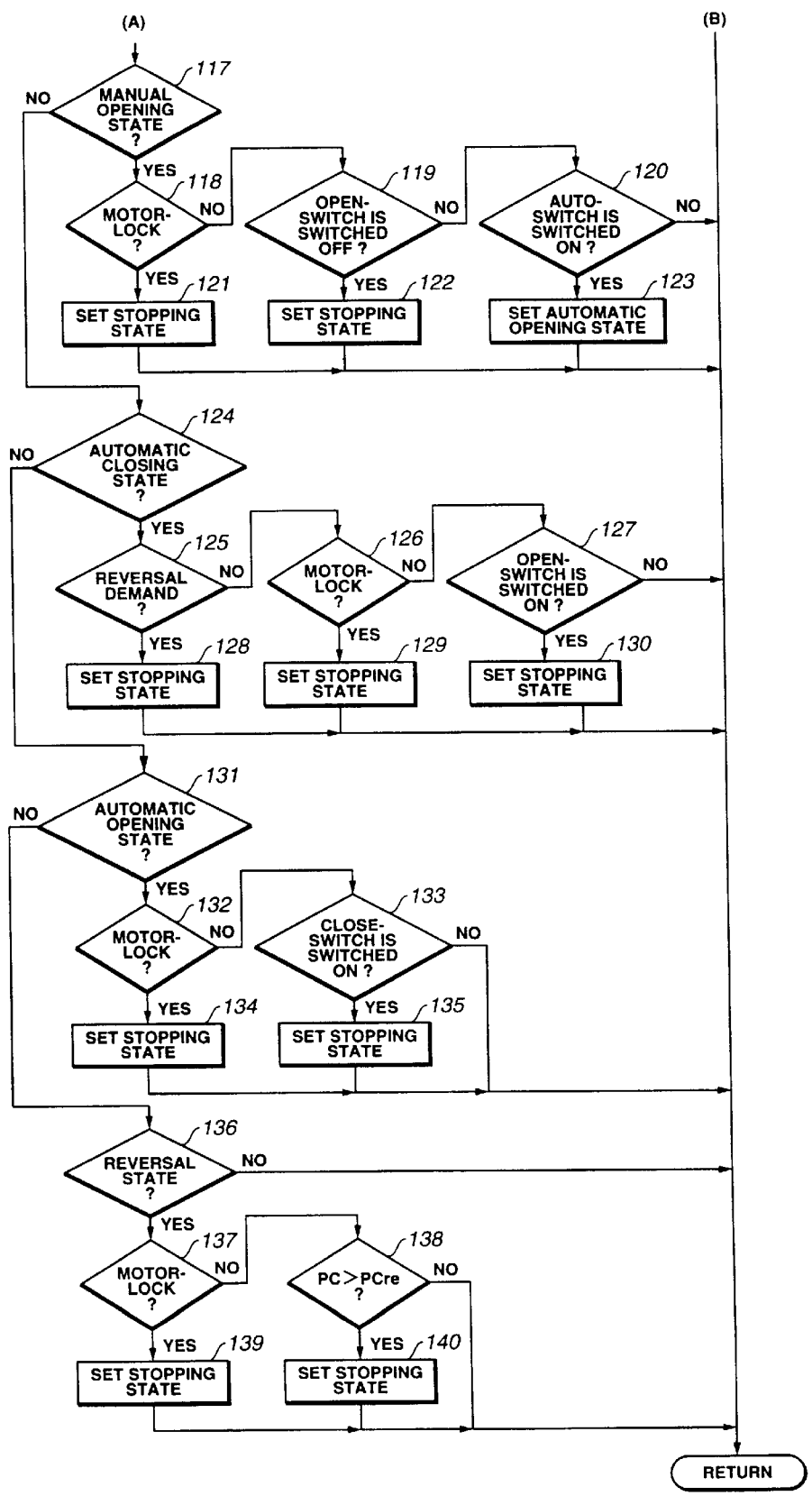
Figure 11:
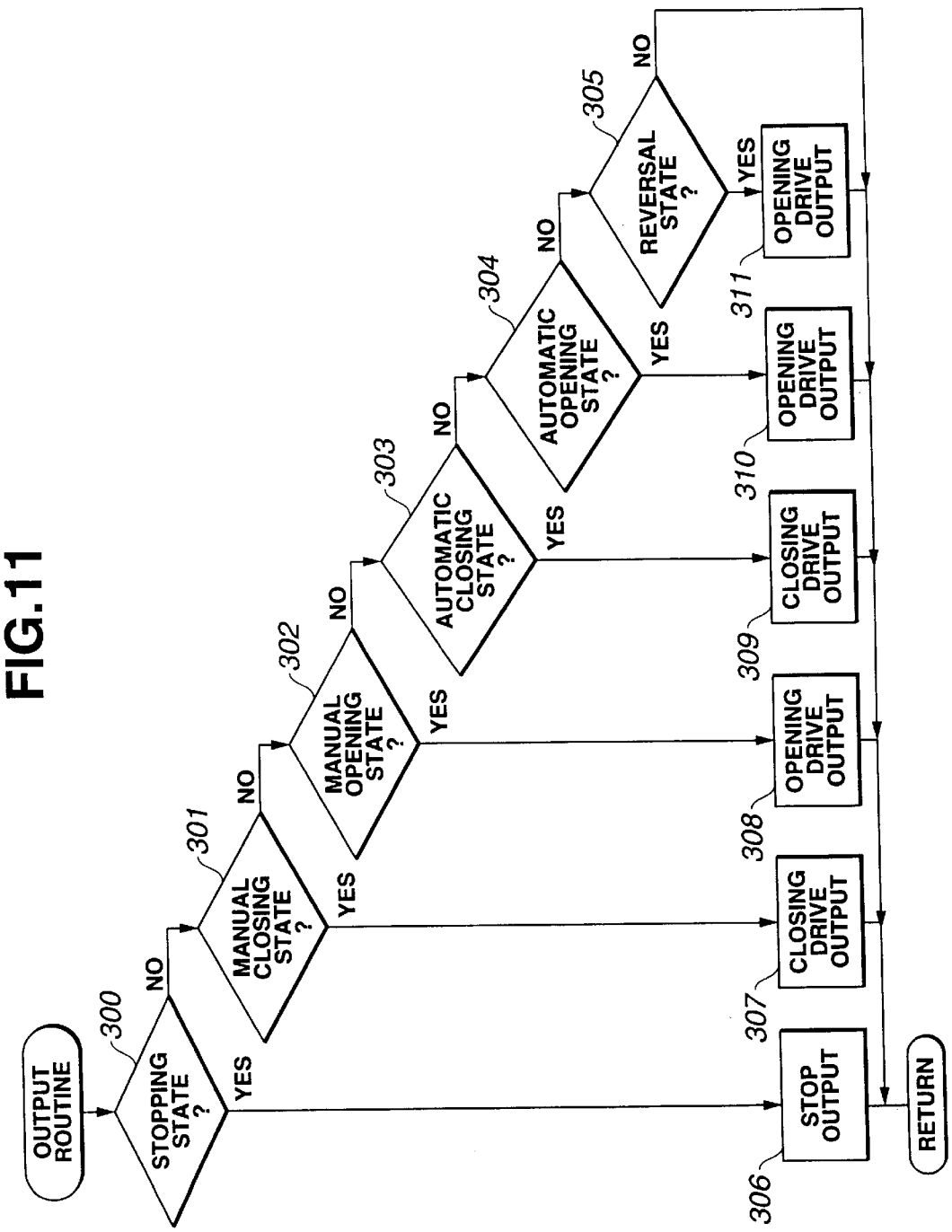
FIG. 11 is a flowchart of the output routine used for the control in the power window controlling device shown in FIG. 1.
Figure 12:
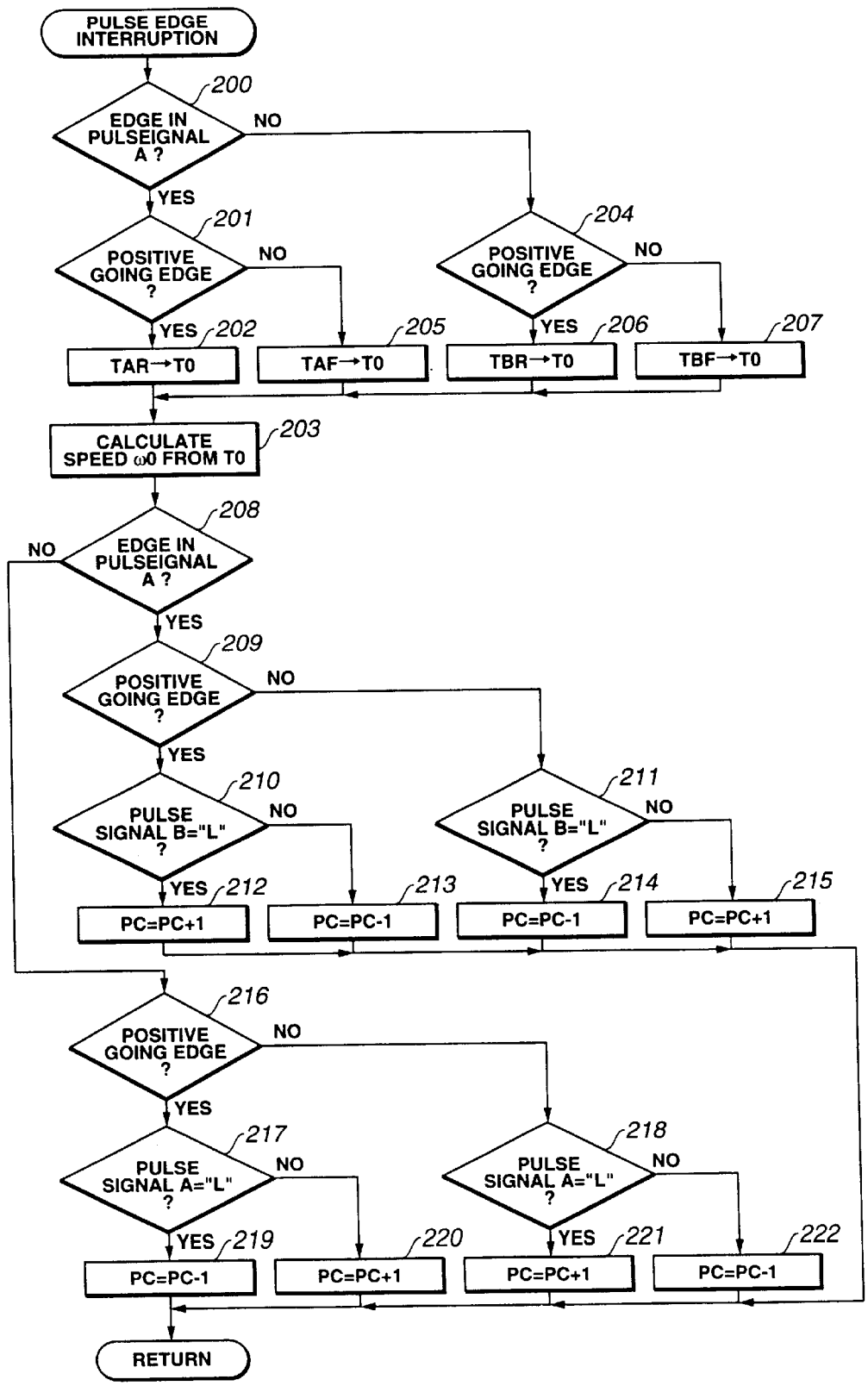
FIG. 12 is a flowchart of the pulse edge interruption routine used for the control in the power window controlling device shown in FIG. 1.
Figure 13:
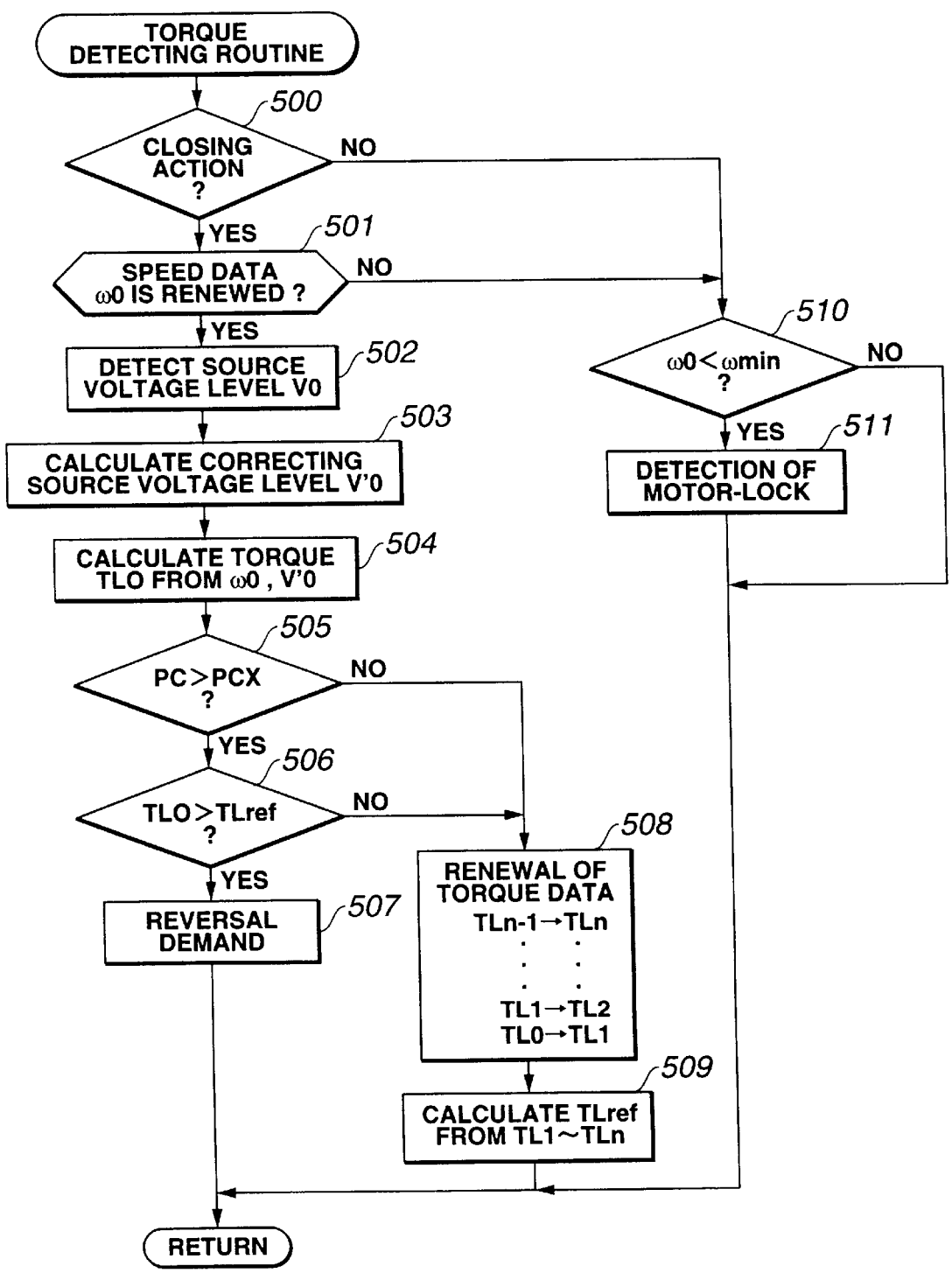
FIG. 13 is a flowchart of the torque detecting routine used for the control in the power window controlling device shown in FIG. 1.

The aforementioned power window controlling device 1 controls movement of the window glass 60 by executing the mainroutine shown in FIG. 10, the output routine shown in FIG. 11, the pulse edge interruption routine shown in FIG. 12 and the torque detecting routine shown in FIG. 13.

In a case where the ignition switch. 5 is switched on, and the OPEN-switch 2, the CLOSE-switch 3 and AUTO-switch 4 are not switched on, it is determined that "the power window is in the stopping state (YES)" at step 100 in the mainroutine shown in FIG. 10 and determined that "reversal demand is not set (NO)" at step 101, the the control returns to the step 100 because "the CLOSE-switch 3 is not switched on (NO)" at step 102 and "the OPEN-switch is not switched on (NO)" at step 103.

At step 300 in the output routine shown in FIG. 11, the power window is determined to be in "stopping state (YES)", therefore the control proceeds to step 306 and "to stop the output" is executed at the step 306.

When the OPEN-switch 2, the CLOSE-switch 3 and the AUTO-switch 4 are not switched on entirely, both the output ports P7 and P8 of the microcomputer CPU becomes to low level, therefore the driving means 24 is not actuated and the window glass 60 is stopped at the full-closed position without current supply to the electric motor 6.

When the OPEN-switch 2 is switched on at time T1 shown in FIG. 6 after the ignition switch 5 is switched on in a state where the window glass 60 is in the full-closed position, the descending command signal generated by the OPEN-switch 2 is taken into the microcomputer CPU. As determination is done that "stopping state is set" yet at the step 100, the control proceeds to the steps 101, 102 and 103, and determination is done "the OPEN-switch 2 is switched on" at the step 103. The control proceeds to step 107 and further proceeds to the output routine after executing to set "opening state" at the step 107.

As determination is done "not to be in stopping state" at the step 300, the control proceeds to step 301 and further proceeds to step 302 because of "not in manual closing state" in the step 301. As determination is done to be "in manual opening state" at the step 302, and "opening drive output" is generated at step 308. According to the execution of "opening drive output", the first output port P7 of the microcomputer CPU becomes to high level and the second output port P8 of the microcomputer CPU becomes to low level, and the electric potential at the power source 50 is given to the first brush terminal 6a of the electric motor 6 in the state where the second brush terminal 6b of the motor is grounded, whereby the armature shaft 6c is rotated in the forward direction and the window glass 60 is opened.

After the armature shaft 6c starts the forward rotation at time T1 shown in FIG. 6 and the window glass 60 begins to travel in the opening direction, the rotation sensor 7 generates the first pulse signal A by the first signal generator 7b thereof at time T2.

When the fist pulse signal A is generated and the positive going edge of the first pulse signal A is detected at time T2, determination is done at step 200 in the pulse edge interruption routine shown in FIG. 12 that "the edge is the first pulse signal A", therefore the control proceeds to step 202 from step 201 after determining the edge to be "positive going edge" at the step 201. At the step 202, it is executed to substitute count value of the first timer TAR for resistor TO, and then the control proceeds to step 208 through step 203.

At the step 208, determination is done that "the edge is the first pulse signal A", it is determined to be "positive going edge" at step 209 and determination is done that "the second pulse signal B is on low level" at step 210, accordingly the control proceeds to step 212 and increment of the position counter PC (+1) is executed at the step 212. Consequently, the interruption processing is finished.

When the rotor 7a of the rotation sensor 7 makes one-fourth revolution at time T4 shown in FIG. 6, the second pulse signal B rises (positive going edge is detected). When the second pulse signal B rises, determination is done that "the edge is not the first pulse signal A" at the step 200 in the interruption routine, and the control proceeds to step 204 and step 206. Determination is done to be "positive gong edge" at the step 204 and it is executed to substitute count value of the second timer TBR for the resistor TO at the step 206. The control proceeds to the step 203 and further proceeds to the step 208 from the step 203.

As determination is done that "the edge is not the first pulse signal A" at the step 208, it is determined to be "positive going edge" at step 216 and determined that "the first pulse signal A is not on low level" at step 217. Further, the control proceeds to step 220, increment of the position counter PC (+1) is executed at the step 220 and the interruption processing is finished.

At time T6, the rotor 7a of the rotation sensor 7 makes a half revolution, whereby the first pulse signal A falls (negative going edge). When the first pulse signal A falls, the control proceeds to the step 201 as determination is done that "the edge is the first pulse signal A" at the step 200 in the interruption routine, the control further proceeds to step 205 and it is executed to substitute count value of the third timer TAF for the resistor TO since determination is done not to be "positive going edge" at the step 201. The control proceeds to the step 203 and further proceeds to the step 208 through the step 203.

The control proceeds to the step 209 after determining that "edge is the first pulse signal A" at the step 208, and proceeds to step 211 since the determination is done not to be "positive going edge" at the step 209. At the step 211, it is determined that "the second pulse signal B is not on low level", the control proceeds to step 215 and increment of the position counter PC (+1) is executed, thereby finishing the interruption processing.

At time T8, the rotor 7a of the rotation sensor 7 makes three-fourth revolutions, whereby the second pulse signal B falls. When the second pulse signal B falls, it is determined at the step 200 in the interruption routine that "edge is not the first pulse signal A", the control proceeds to the step 204 and determination is done not to be "positive going edge" at the step 204. The control proceeds to step 207, it is executed to substitute count value of the fourth timer TBF for the resistor TO and the control proceeds to the step 208 through the step 203.

As it is determined that "edge is not the first pulse signal A" at the step 208, the control proceeds to the step 216, determination is done not to be "positive going edge" at the step 216 and the control proceeds to step 218. It is determined at the step 218 that "the first pulse signal A is on low level", the control proceeds to step 221 and increment of the position counter PC (+1) is executed, whereby the interruption processing is completed.

At time T10 shown in FIG. 6, the rotor 7a of the rotation sensor 7 finishes one-revolution in the first time and starts the rotation in the second time, whereby the first pulse signal A rises again. When the first pulse signal A rises, it is determined at the step 200 in the interruption routine that "edge is the first pulse signal A", the control proceeds to the step 201 and determination is done to be "positive going edge" at the step 201. The control further proceeds to the step 203, it is executed to substitute count value of the first timer TAR for the resistor TO, and then the control proceeds to the step 203 and further to the step 208 after executing to "calculate the speed ω0 from value of the resistor TO" substituted with the count value of the first timer TAR at the step 203.

It is determined at the step 208 that "edge is the first pulse signal A", the control proceeds to the step 209 and determination is done to be "positive going edge" at the step 209. Determination is further done at the step 210 that "the second pulse signal B is on low level", the control further proceeds to the step 211 and increment of the position counter PC (+1) is executed at the step 211, consequently the interruption processing is finished.

At time T12 shown in FIG. 6, the rotor 7a of the rotation sensor 7 makes five-fourth revolutions and the second pulse signal B rises again. When the second pulse signal B rises, it is determined at the step 200 in he interruption routine that "edge is not the first pulse signal A", the control proceeds to the step 204 and determination is done to be "positive going edge" at the step 204. The control proceeds to the step 206, it is executed to substitute count value of the second timer TBR for the resistor TO and the control proceeds to the step 203 and the step 208 after executing to "calculate the speed ω0 from value of the resistor TO" at the step 203.

At the step 208, it is determined that "edge is not the first pulse signal A", the control proceeds to the step 216 and determination is done to be "positive going edge" at the step 216. The control further proceeds to the step 217, determination is done at the step 217 that "the first pulse signal A is not on low level", the control proceeds to the step 220 and increment of the position counter PC (+1) is executed at the step 220, consequently the interruption processing is over.

At time T14 shown in FIG. 6, the rotor 7a of the rotation sensor 7 makes three half revolution and the first pulse signal A falls. According to the fall of the first pulse signal A, it is determined at the step 200 in the interruption routine that "edge is the first pulse signal A", the control proceeds to the step 210 and determination is done not to be "positive going edge" at the step 201. The control proceeds to the step 205, it is executed to substitute count value of the third timer TAF for the resistor TO at the step 205, the control proceeds to the step 203 and further proceeds to the step 208 after executing to "calculate the speed ω0 from value of the resistor TO at the step 203.

It is determined at the step 208 that "edge is the first pulse signal A", the control proceeds to the step 209 and determination is done not to be "positive going edge" at the step 209. It is further determined at the step 211 that "the second pulse signal B is on low level" at the step 211, the control further proceeds to the step 215 and increment of the position counter PC (+1) is executed at the step 215, and then the interruption processing is finished.

At time T16 shown in FIG. 6, the rotor 7a of the rotation sensor 7 makes seven-fourth revolution, whereby the second pulse signal B falls. When the second pulse signal B falls, it is determined at the step 200 in the interruption routine that "edge is not the first pulse signal A", the control proceeds to the step 204 and determination is done not to be "positive going edge" at the step 204. The control proceeds to the step 207, it is executed to substitute count value of the fourth timer TBF for the resistor TO and the control proceeds to the step 203. At the step 203, it is executed to "calculate the speed ω0 from value of the resistor TO at the step 203 and the control proceeds to the step 208.

At the step 208, it is determined that "edge is not the first pulse signal A", therefore the control proceeds to the step 216, determination is done not to be "positive going edge" at the step 216 and determination is further done at the step 218 that "the first pulse signal A is on low level." The control proceeds to the step 221, increment of the position counter PC (+1) is executed at the step 221, and the interruption processing is finished.

As described above, when the rotation sensor 7 generates the first pulse signal A and the second pulse signal B in accordance that the armature shaft 6c starts the forward rotation and the window glass 60 starts to move in the opening direction, the first timer TAR measures the rotational period of the armature shaft 6c every rotation of the rotor 7a of the rotation sensor 7. The second timer TBR measures the rotational period of the armature shaft 6c with delay of one-fourth period from the first timer TAR every rotation of the rotor 7a of the rotation sensor 7. The third timer TAF measures the rotation period of the armature shaft 6c with delay of one-fourth period from the second timer TBR every rotation of the rotor 7a of the rotation sensor 7. Furthermore, the fourth timer TBF measures the rotation period of the armature shaft 6c with delay of one-fourth period from the third timer TAF every rotation of the rotor 7a of the rotation sensor 7, whereby traveling speed of the window glass 60 is measured. The microcomputer CPU detects the present position of the window glass 60 through the position counter PC indirectly.

At the time the armature shaft 6c starts the forward rotation and the window glass 60 begins to move in the opening direction, the torque detecting routine is executed at the same time. In the torque detecting routine as shown in FIG. 13, first of all, it is determined at step 500 that "closing action is not set", therefore the control proceeds to step 510 and it is determined at the step 510 that "the speed ω0 calculated in the pulse edge interruption routine is not smaller than the predetermined minimum value ωmin" because the window glass 60 is traveling in the opening direction. Accordingly, the control returns to the first step 500 and such the routine executed repeatedly.

When the OPEN-switch 2 is switched off while the window glass 60 is traveling in the opening direction, the descending command signal generated by the OPEN-switch 2 becomes not to be taken into the microcomputer CPU. Whereby, it is determined that "stopping state is not set" at the step 100 in the mainroutine, and the control proceeds to step 108 and further to step 117 as determination is done that "manual closing state is not set" at the step 108. At the step 117, determination is done to be "manual opening state", the control proceeds to step 118 and it is determined at the step 118 that "motor-lock is not detected." Therefore, the control proceeds to step 119, the OPEN-switch 2 is determined to be switched off at the step 119, and the control proceeds to the output routine after setting "stopping state" at the step 122.

At the step 300 in the output routine, it is determined that "stopping state is set", therefore the control proceeds to the step 306 and it is executed to "stop output" at the step 306. By the execution of "stop output", the first output port P7 of the microcomputer CPU becomes to low level and the second output port P8 of the microcomputer CPU becomes to high level, accordingly current supply is interrupted to the first and second brush terminals 6a and 6b of the electric motor 6 and the motor 6 stops the forward rotation of the armature shaft 6c, thereby stopping the window glass 60.

When the AUTO-switch 4 is switched on at the same time the OPEN-switch 2 is switched on in a case where the window glass 60 is stopped, the descending command signal from the OPEN-switch 2 and the automatic action command signal from the AUTO-switch 4 are taken into the microcomputer CPU. Accordingly, the control proceeds to the step 103 through the steps 100, 101 and 102, and further returns to the step 100 after determining that "the OPEN-switch 2 is switched on" at the step 103 and setting the "opening state" at the step 107. Subsequently, the steps 100, 108, 117, 118 119 and 120 are executed in the mainroutine, it is determined at the step 120 that "the AUTO-switch 4 is switched on", therefore the control proceeds to step 123 and further proceeds to the output routine after setting "automatic opening state" at the step 123.

In the output routine, the control proceeds to step 304 from the step 300 after determination at the steps 301, 302 and 303, and proceeds to step 310 by determining "automatic opening state" to be set at the step 304 whereby opening drive output is continuously executed at the step 310.

According to the continuous opening drive output, the power source 50 is connected to the first brush terminal 6a of the electric motor 6 and the second brush terminal 6b of the motor 6 is grounded and the armature shaft 6c is rotated in the forward direction. The window glass 60 is moved continuously in the opening direction because the opening drive output is continued even after the OPEN-switch 2 is switched off. The window glass 60 is obstructed to move by bumping with the vehicle body at the full-opened position after continuation of the traveling in the opening side. Consequently, determination is done at the step 500 in the torque detection routine that "closing action is not set", therefore the control proceeds to step 510 and it is determined at the step 510 that "the speed ω0 calculated in the pulse edge interruption routine becomes smaller than the predetermined minimum value ω min" according to the bump of the window glass 60 with the vehicle body at the full-opened position. Therefore, the control proceeds to step 511 and further proceeds to the mainroutine after setting "detection of motor-lock" at the step 511.

At the step 100 in the mainroutine, it is determined that "stopping state is not set", therefore the control proceeds to step 124 from the step 100 through the steps 108 and 117 by determining to be "NO" at the steps 108 and 117, and further proceeds to step 132 through steps 124 and 131 because determination is done that "automatic closing state is not set" at the step 124 and determination is also done to be "automatic opening state" at the step 131. At the step 132, it is determined to be "motor-lock" and the control proceeds to the output routine from step 134 after setting "stopping state" at the step 134.

At the step 300 in the output routine, it is determined that "stopping state is set", therefore the control proceeds to the step 306 and it is executed to "stop output." Whereby the window glass 60 is stopped at the full-closed position.

When the CLOSE-switch 3 is switched on at the time of stopping the window glass 60 in the full-opened position, the ascending command signal is taken into the microcomputer CPU from the CLOSE-switch 3. Accordingly, determination is done at the steps 100, 101, 102 and 104 in the mainroutine and the control proceeds to the output routine after setting "closing state (manual closing state)" at step 106. At the output routine, determination is done at the steps 300 and 301, the control proceeds to step 307 and "closing drive output" is executed at the step 307.

According to the closing drive output, the first brush terminal 6a of the electric motor 6 is grounded and the second brush terminal 6b of the motor 6 is connected with the power source 50, thereby rotating the armature shaft 6c of the motor 6 in the reverse direction and starting the window glass 60 to move in the closing direction.

Figure 7:
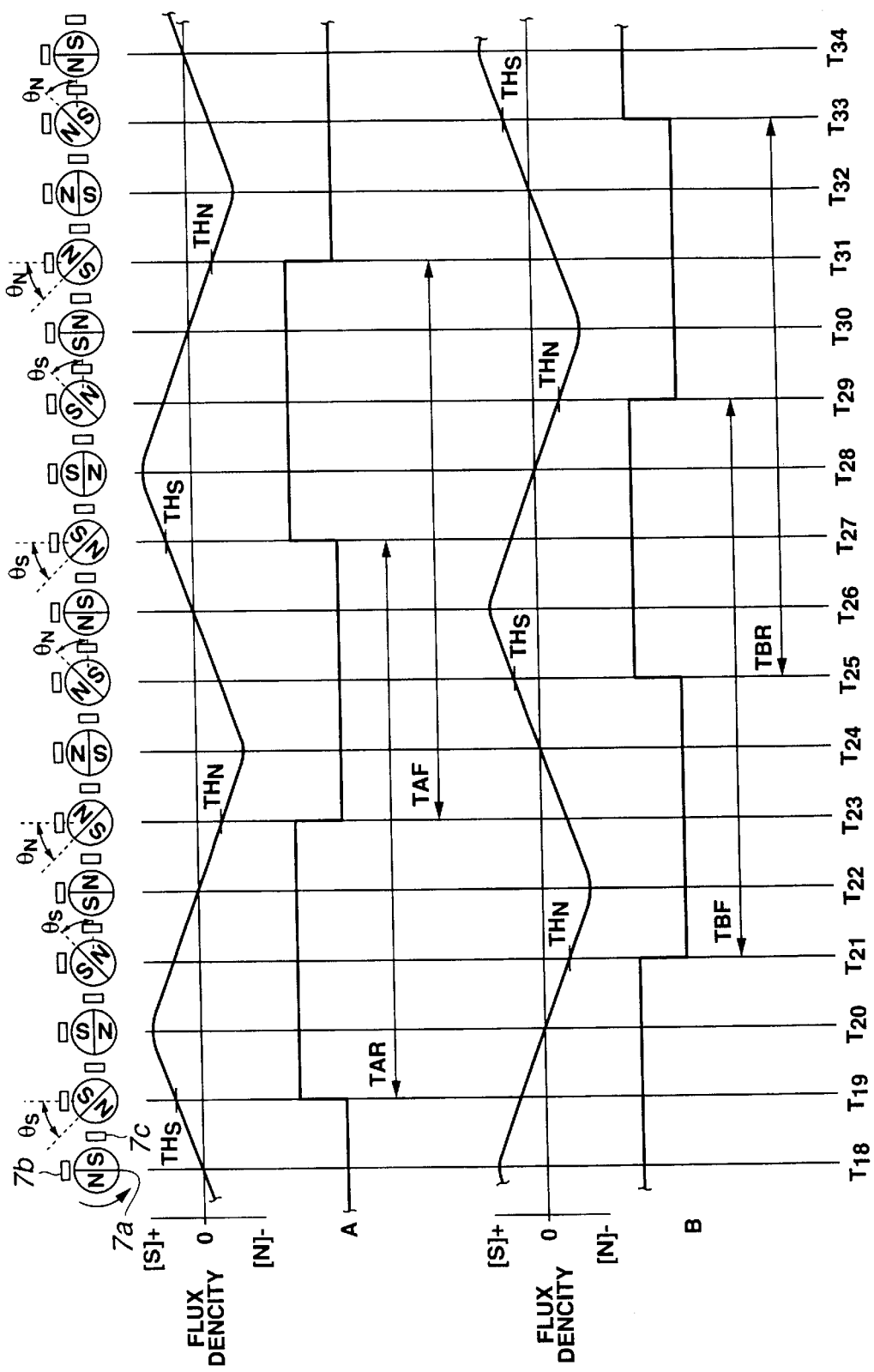

In accordance that the armature shaft 6c of the motor 6 starts the reverse rotation at time T18 as shown in FIG. 7, the rotation sensor 7 generates the first pulse signal A at time T19 by the first signal generator 7b and generates the second pulse signal B with phase difference of one-fourth period from the first pulse signal A by the second signal generator 7c at time T21.

When the first pulse signal A is generated and the positive going edge of the first pulse signal A is detected at time T19, the control proceeds the step 203 through the steps 200, 201 and 202 in the pulse edge interruption routine shown in FIG. 12, it is executed at the step 203 to "calculate the speed ω0 from count value of the first timer TAR", and then control proceeds to the step 208. Furthermore, determination is done at the steps 208, 209 and 210, and the interruption processing is finished by executing decrement of the position counter PC (−1) at step 213.

When the rotor 7a of the rotation sensor 7 makes one-fourth revolution at time T21 shown in FIG. 7, the second pulse signal B falls (negative going edge). When the second pulse signal B falls, the control proceeds to the step 203 through the steps 200, 204 and 207 in the interruption routine, it is executed at the step 203 to "calculate the speed ω0 from count value of the fourth timer TBF", and the control proceeds to the step 208. Then, determination is done at the steps 208, 216 and 218, and the interruption processing is finished after executing decrement of the position counter PC (−1) at step 222.

When the rotor 7a of the rotation sensor 7 makes a half revolution at time T23 shown in FIG. 6, the first pulse signal A falls. When the first pulse signal A falls, the control proceeds to the step 203 through the steps 200, 201 and 205 in the interruption routine, it is executed at the step 203 to "calculate the speed ω0 from count value of the third timer TAF" and the control proceeds to the step 208. Furthermore, determination is done at the steps 208, 209 and 211, and the control proceeds to step 214 because of determination that "the second pulse signal B is on low level" at the step 211. The interruption processing is finished by executing decrement of the position counter PC (−1) at the step 214.

When the rotor 7a of the rotation sensor 7 makes three-fourth revolutions at time T25, the second pulse signal B rises (positive going edge). The control proceeds to the step 203 after executing the steps 200, 204 and 207, it is executed at the step 203 to "calculate the speed ω0 from count value of the fourth timer TBF" and the control proceeds to the step 208. Furthermore, determination is done again at the steps 208, 216 and 217, and the interruption processing is completed after executing decrement of the position counter PC (−1) at step 219.

When the rotor 7a of the rotation sensor 7 makes one revolution at time T27, the first pulse signal A rises again. The processes in the steps 200 to 203 are executed and the control proceeds to the step 208 after executing to "calculate the speed ω0 from count value of the first timer TAR" at the step 203. The processes in the steps 208, 209, 210 and 213 are executed and the interruption processing is finished by executing decrement of the position counter PC (−1) at the step 213. Furthermore, the similar processing is done at time T29 and time T31 after the time T27 shown in FIG. 7.

As mentioned above, when the rotation sensor 7 generates the first pulse signal A and the second pulse signal B in accordance that the armature shaft 6c starts the reverse rotation and the window glass 60 begins to move in the closing direction, the first timer TAR, the second timer TBF, the third timer TAF and the fourth timer TBF measure the rotational period of the armature shaft 6c every rotation of the rotor 7a of the rotation sensor 7, thereby measuring the traveling speed of the window glass 60. The microcomputer CPU detects the present position of the window glass 60 through the position counter PC indirectly.

In the case where the armature shaft 6c starts the reverse rotation and the window glass 60 begins to move in the closing direction, the torque detection routine is executed at the same time. When determination is done to be "closing action" at the step 500 in the torque detection routine, it is determined at step 501 that "speed data ω0 is renewed", so that the control proceeds to step 502 and further proceeds to step 503 after executing to "detect source voltage level VO" at the step 502. It is executed to "calculate the correcting source voltage level V'O" at the step 503 and further executed to "calculate the torque TL0 from the speed data ω0 and the correcting source voltage level V'O" at step 504, and the control proceeds to step 508 if it is determined that "count value of the position counter PC is not larger than critical value (absolute value) PCX of the reversal region" at step 505.

Figure 14:
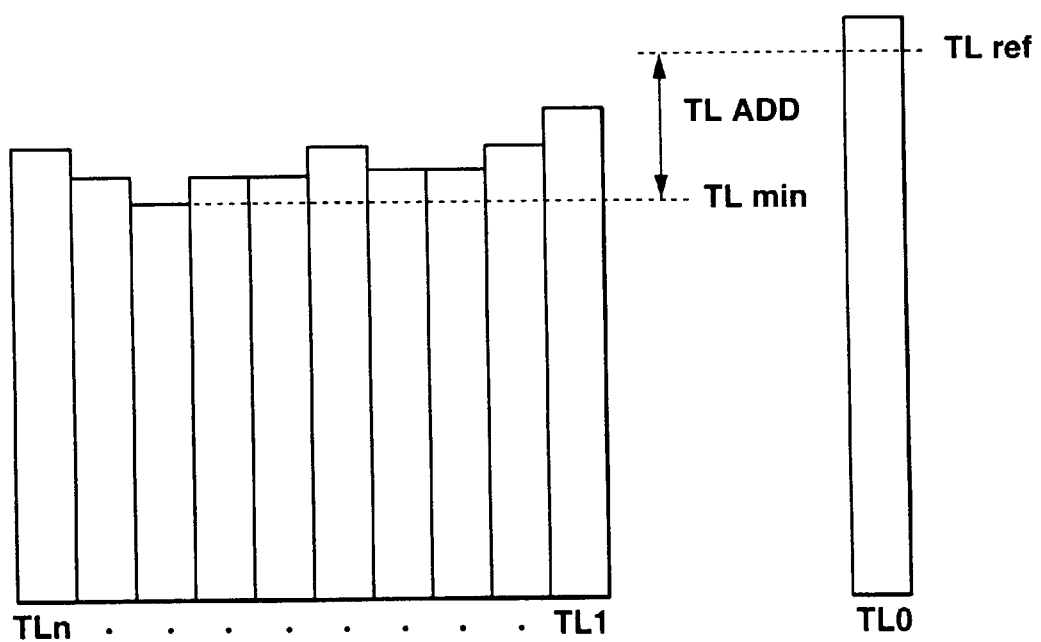
FIG. 14 is a chart illustrating the torque detection processing in the power window controlling device shown in FIG. 1.

At the step 508, renewal of the torque data is carried out. The renewal of the torque data is carried out by shifting the torque data of TLn to TL1 stored in the previous routine by one. Further, criterion value TLref is calculated at step 509 for deciding "pinching" (obstruction-caught state). The pinching criterion value TLref is obtained by adding the predetermined value TLADD (constant) to the minimum value TLmin among the torque data TLn to TL1 as shown in FIG. 14. The pinching criterion value TLref (=TLmin+TLADD) is used for comparison with the torque TL0 obtained in the step 504. The microcomputer CPU performs reversal action when the torque TL0 becomes larger than the pinching criterion TLref.

When the pinching of the obstruction is caused within the reversal allowable region, the steps 500, 501, 502, 503 and 504 of the torque detection routine are executed, and the control proceeds to step 506 by determining that "count value of the position counter PC is larger than the critical value PCX of the reversal region" at the step 505.

Because it is determined at the step 506 that "torque TL0 becomes larger than pinching criterion value TLref" owing to the pinching, "reversal demand" is executed at step 507 and the control proceeds to the mainroutine.

In the mainroutine, the steps 100, 108, 117 and 124 are executed, the control proceeds to step 125 and further proceeds to step 128 since "reversal demand is set" at determination in the step 125. The control proceeds to the output routine after setting "stopping state" at the step 128.

It is determined at the step 300 in the output routine that "stopping state is set", so that "stop output" is executed at the step 306 and the control proceeds to the mainroutine. The window glass 60 is stopped by executing to "stop output".

Furthermore, the control proceeds to the step 101 from the step 100 in the mainroutine, determination is done at the step 101 that "reversal demand is set" and the control proceeds to the output routine after executing to "set reversal state".

In the output routine, the control proceeds to step 305 through the steps 300, 301, 302, 303 and 304, it is determined at the step 305 that "reversal state is set", therefore the control proceeds to step 311, "opening drive output" is executed at the step 311.

Accordingly, the first output port P7 of the microcomputer CPU becomes to high level and the second output shaft P8 of the microcomputer CPU becomes to low level, whereby the electric potential of the power source 50 is given to the first brush terminal 6a of the electric motor 6 of which second brush terminal 6b is grounded and the window glass 60 is moved reversely in the opening direction according to the forward rotation of the armature shaft 6c of the motor 6.

When the armature shaft 6c of the motor 6 starts the forward rotation, the control proceeds to step 138 through the execution of the steps 100, 108, 117, 124, 131, 136 and 137 in the mainroutine. The step 138 is a process for stopping the window glass 60 when the window glass 60 is lowered to the predetermined position. It is determined at the step 138 that "count value of the position counter PC does not exceed the predetermined count value PCre" at the beginning of the reversal action, therefore the control returns to the step 100 and the mainroutine is repeated. When determination is done that "pulse count PC exceeds the predetermined count value PCre" according to the lowering of the window glass 60 down to the predetermined position, the control proceeds to step 140 from the step 138 and further proceeds to the output routine after setting "stopping state" at the step 140.

In the determination at the step 300 of the output routine, it is determined that "stopping state is set", so that the current supply is interrupted to the first and second brush terminals 6a and 6b of the motor 6, thereby stopping the window glass 60.

In a case where the obstruction is pinched by the window glass 60 at the position near to the full-opened position, the window glass 60 is prevented to move by arriving in the full-opened position before the pulse count PC exceeds the predetermined count value PCre after the start of the forward rotation of the armature shaft 6c. Accordingly, the mainroutine is executed after setting "detection of motor-lock" at the step 511 in the torque detection routine, the control proceeds to the step 139 in the mainroutine through the steps 100, 108, 117, 124, 131, 136 and 137 and the control proceeds to the steps 300 and 306 in the output routine after setting "stopping state" at the step 139. It is executed to "stop output" at the step 306 in the output routine, thereby stopping the window glass 60 at the full-opened position.

Figure 15:
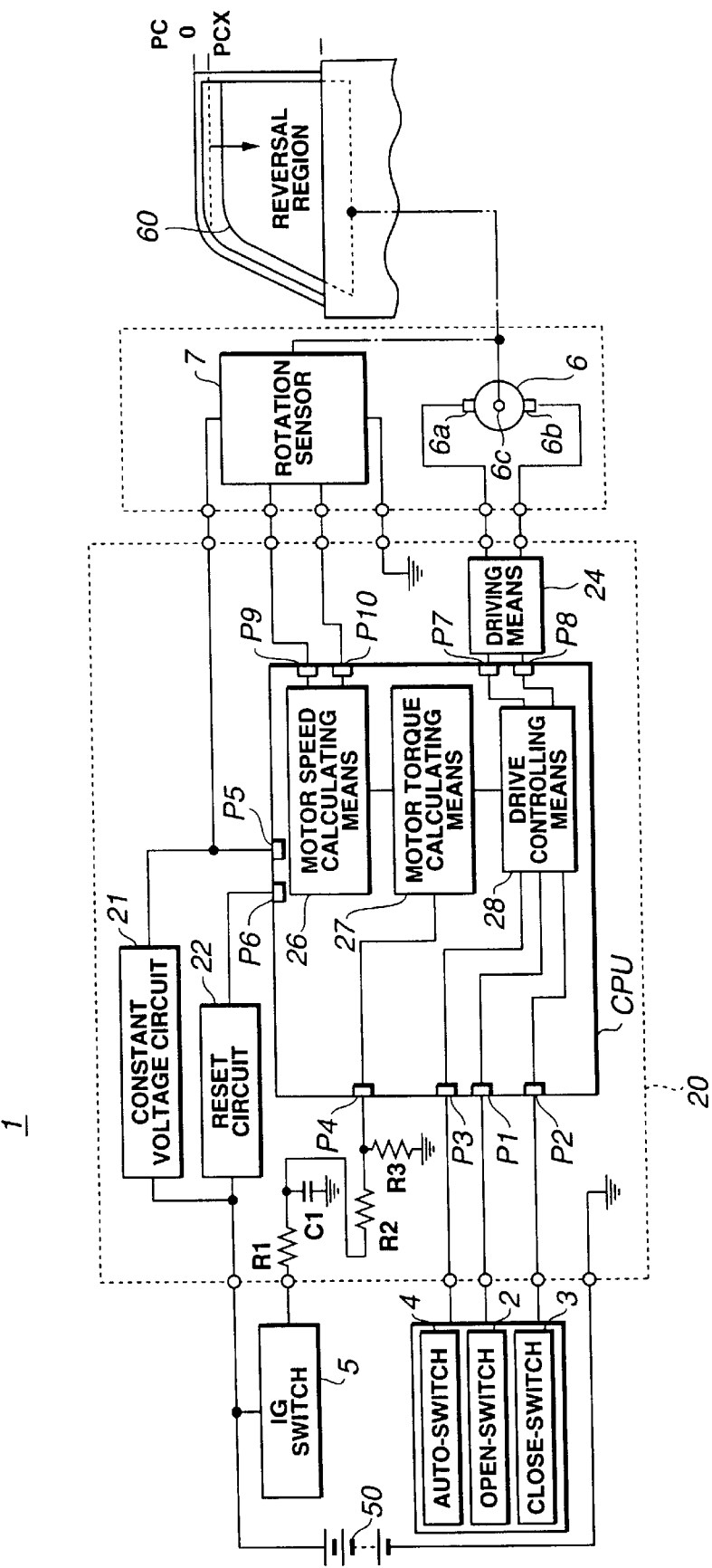
FIG. 15 is a block diagram of the power window controlling device according to the second embodiment of this invention.

The second embodiment is shown in FIG. 15 of the power window controlling device according to this invention.

In the power window controlling device 1 in this example, the source voltage detecting circuit 23 is composed of a voltage correcting part 23a consisting of a resistor R1 and a capacitor C1, and a source voltage detecting part 23b consisting of a resistors R2 and R3. The time constant of the voltage correcting part 23a consisting of the resistor R1 and the capacitor C1 is set so as to be nearly equal to the time constant of the rotational speed of the electric motor 6.

When the ignition switch 5 is switched on, a voltage signal of the power source 50 integrated by the voltage correcting part 23a is given to the source voltage detecting part 23b, and the motor torque calculating means 27 is given with the voltage signal corresponding to the variation of the power source 50 by the source voltage detecting part 23b. Also in this case, the control action is carried out similarly to the first embodiment of this invention.

Figure 16:
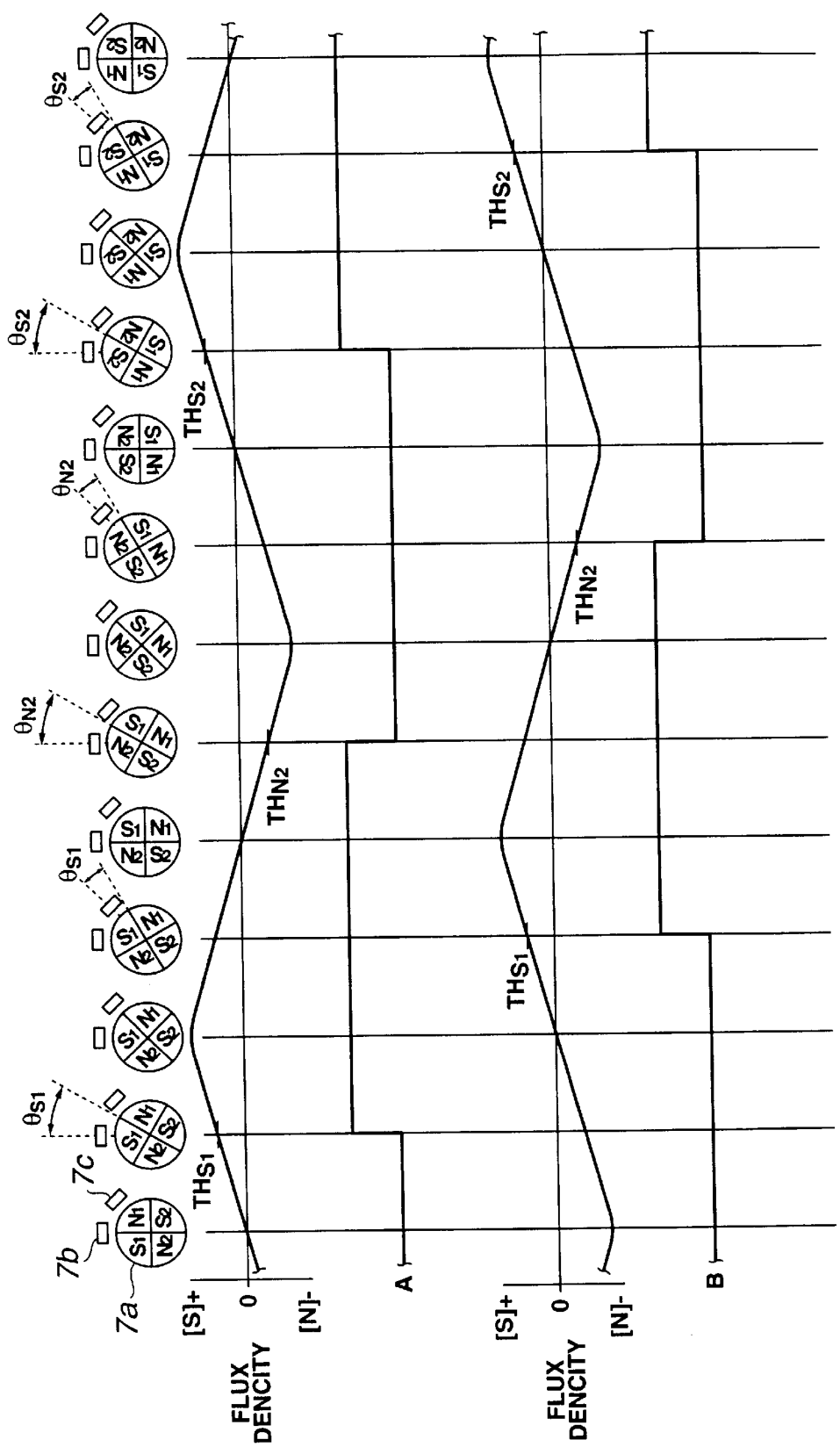
FIGS. 16 and 17 are time charts illustrating the action in the power window controlling device according to the third embodiment of this invention.
Figure 17:
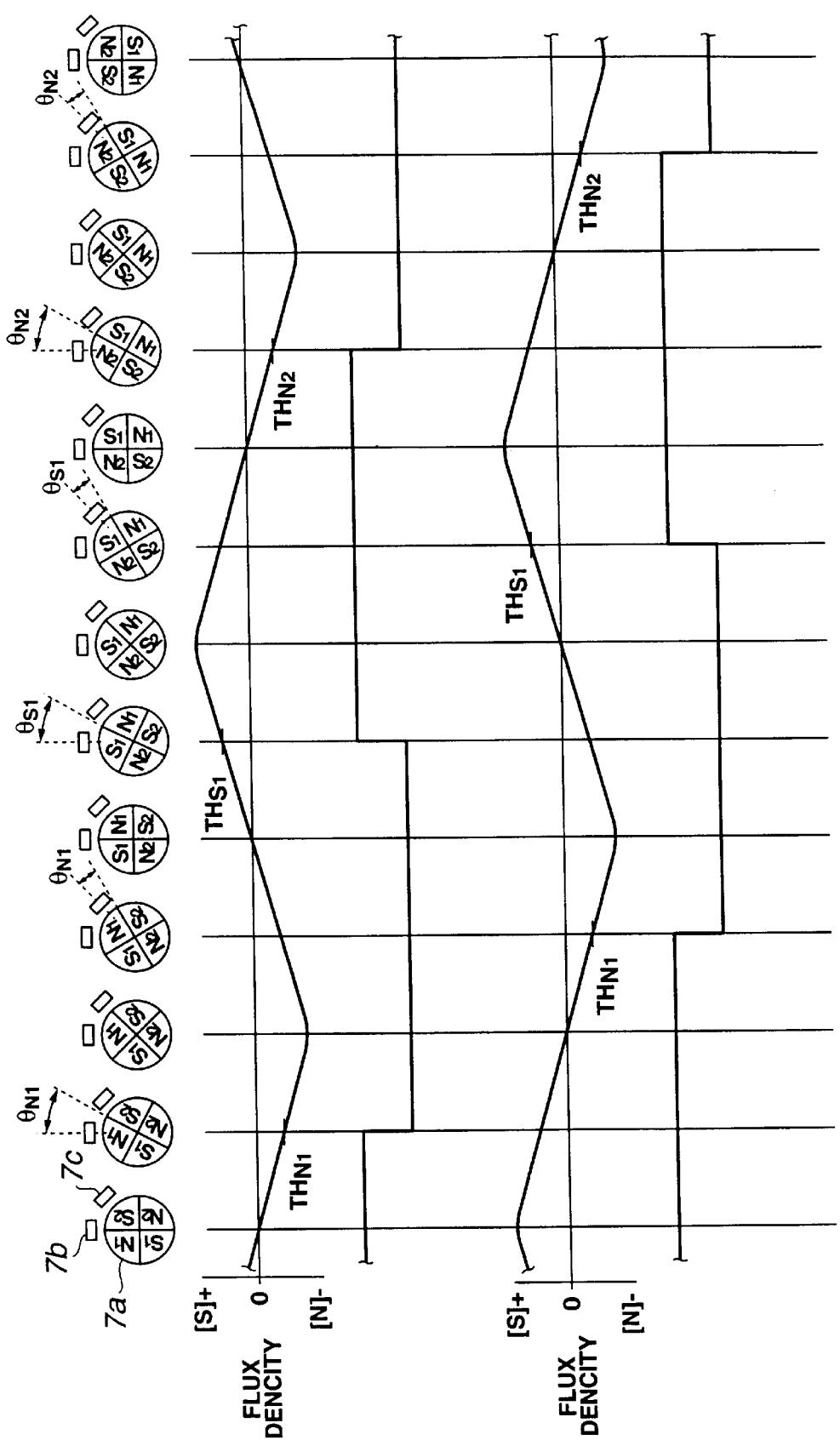

Time charts are shown in FIG. 16 to FIG. 18 in a case where a four-pole magnet is used for the rotor 7a of the rotation sensor 7 in the power window controlling device according to this invention.

In this case, the rotor 7a of the rotation sensor 7 is disposed with a pair of north poles and a pair of south poles oppositely. Accordingly, the rotation sensor 7 generates second pulse signal B from the second signal generator 7c with the phase difference of one-eighth period against the first pulse signal A generated by the first signal generator 7b according to the rotation of the rotor 7a.

The microcomputer CPU is housed with a first timer TAR1, a second timer TBR1, a third timer TAF1, a fourth timer TBF1, a fifth timer TAR2, a sixth timer TBR2, a seventh timer TAF2 and a eighth timer TBF2, respectively as shown in FIG. 18, and structured similarly to the first embodiment excepting the above.

Also in this case, when the rotation sensor 7 generates the first pulse signal A and the second pulse signal B in accordance that the armature shaft 6c starts the forward rotation and the window glass 60 begins to move on the opening side, the first timer TAR1 counts every rotation of the rotor 7a of the rotation sensor 7, the second timer TBR1 counts every rotation of the rotor 7a of the rotation sensor 7 with delay of one-eighth period from the first timer TAR1, the third timer TAF1, the fourth timer TBF1, the. fifth timer TAR2, the sixth timer TBR2, the seventh timer.TAF2 and the eighth timer TBF2 count every rotation of the rotor 7a of the rotation sensor 7 with delay of one-eighth period against the respective prior timers. The microcomputer CPU detects the present position of the window glass 60 in this manner.

As mentioned above, the power window controlling device according to this invention is provided with the motor speed calculating means for calculating the rotational speed of the electric motor on basis of the rotation signal generated from the rotation signal generator of the rotation sensor and generating the rotational speed signal, the source voltage detecting circuit for detecting electric potential of the power source and converting the electric potential into the voltage signal, the data signal generating means for generating the correcting data signal obtained by including correction of time constant nearly equal to the time constant TO of the electric motor to the voltage signal given by the source voltage detecting circuit, and the motor torque calculating means for calculating correcting data of torque of the electric motor according to the correcting data signal and the rotational speed signal of the electric motor given by the motor speed calculating means, and for supplying the descending demand signal to the drive means to lower the window glass at the time when the correcting data of the torque of the electric motor increases over the predetermined criterion value while the drive controlling means is supplying the ascending drive signal to the driving means in response to the ascending command signal generated from the CLOSE-switch, and so designed as to detect the state where the obstruction is caught by the window glass (obstruction-caught state) by calculating the correcting data of the motor torque and comparing the correcting data with the criterion value in a case where the voltage of the power source changes. Therefore, it is possible to prevent misunderstanding of the obstruction-caught state.

What is claimed is:

1. A power window controlling device for a motor vehicle comprising:

a CLOSE-switch operable for generating a descending command signal to lower a window glass of the motor vehicle;

an OPEN-switch operable for generating an ascending command signal to raise the window glass;

an electric motor for driving the window glass of the motor vehicle upwardly and downwardly, rotational speed of which being gradually changed with a time constant TO according to a variation of electric voltage supplied thereto;

a driving means connected to a power source for supplying an electric current to said electric motor to drive the window glass upwardly and downwardly;

a drive controlling means connected to said CLOSE-switch and said OPEN-switch for generating an ascending drive signal and supplying the signal to said driving means in response to the ascending command signal supplied from said CLOSE-switch, and for generating a descending drive signal and supplying the signal to said driving means in response to the descending command signal supplied from said OPEN-switch;

a rotation sensor having a rotation signal generator for generating for generating a rotation signal of an armature shaft of said electric motor;

a motor speed calculating means connected to said rotation sensor for calculating the rotational speed of said electric motor on basis of the rotation signal generated from the rotation signal generator of said rotation sensor and generating a rotational speed signal;

a source voltage detecting circuit connected to the power source for detecting electric potential of the power source and converting said electric potential into a voltage signal;

a data signal generating means for generating a data signal obtained having a time constant nearly equal to the time constant TO of said electric motor based on the voltage signal supplied from said source voltage detecting circuit and a predetermined data with information of time constant TO according to the time constant of said electric motor; and a motor torque calculating means for calculating amended torque data of the electric motor according to the data signal supplied from said data signal generating means and to the rotational speed signal of the electric motor supplied from said motor speed calculating means, and for supplying a descending demand signal to said drive controlling means to lower the window glass at the time when the amended torque data of the electric motor increases over a predetermined criterion value while said drive controlling means operates in response to the ascending command signal generated form said CLOSE-switch.

2. A power window controlling device for a motor vehicle comprising:

a CLOSE-switch operable for generating a descending command signal to lower a window glass of the motor vehicle;

an OPEN-switch operable for generating an ascending command signal to raise the window glass;

an electric motor for driving the window glass of the motor vehicle upwardly and downwardly, rotational speed of which being gradually changed with the function of time according to a variation of source voltage supplied thereto;

a driving means connected to a power source for supplying an electric current to said electric motor to drive the window glass upwardly and downwardly;

a driving controlling means connected to said CLOSE-switch and said OPEN-switch for generating an ascending drive signal and supplying the signal to said signal means in response to the ascending command signal supplied from said CLOSE-switch, and for generating a descending drive signal and supplying the signal to said driving means in response to the descending command signal supplied from said OPEN-switch;

a rotation sensor having a rotation signal generator for generating a rotation signal of an armature shaft of said electric motor;

a motor speed calculating means connected to said rotation sensor for calculating a rotation speed of said electric motor on basis of the rotation signal generated from the rotation signal generator of said rotation sensor and generating a rotational speed signal;

a source voltage detecting circuit connected to the power source for detecting electric potential of the power source and converting said electric potential into a voltage signal;

a data signal generating means for generating a data signal having time constant TO and voltage level in proportion to the level of the voltage signal based on the voltage signal supplied from said source voltage detecting circuit and a predetermined data with information of time constant TO being nearly equal to the time function of the rotational speed of said electric motor; and a motor torque calculating means for calculating amended torque data of the electric motor according to the data signal supplied from said data signal generating means and to the rotational speed signal of the electric motor supplied from said motor speed calculating means, and for supplying a descending demand signal to said drive controlling means to lower the window glass at a time when the amended torque data of the electric motor increases over a predetermined criterion value while said drive controlling means operates in response to the ascending command signal generated from said CLOSE-switch.

3. A power supply window controlling device for a motor vehicle comprising:

a CLOSE-switch operable for generating a descending command signal to lower a window glass of the motor vehicle;

an OPEN-switch operable for generating an ascending command signal to raise the window glass;

an electric motor for driving the window glass of the motor vehicle upwardly and downwardly, rotational speed of which being gradually changed with the function of time according to the variation of source voltage supplied thereto;

a driving means connected to a power source for supplying an electric current to said electric motor to drive the window glass upwardly and downwardly;

a driving controlling means connected to said CLOSE-switch and said OPEN-switch for generating an ascending drive signal and supplying the signal to said driving means in response to the ascending command signal supplied from said CLOSE-switch, and for generating a descending drive signal and supplying the signal to said driving means in response to the descending command signal supplied from said OPEN-switch;

a rotation sensor having a rotation signal generator for generating a rotation signal of an armature shaft of said electric motor;

a motor speed calculating means connected to said rotation sensor for calculating the rotation speed of said electric motor on basis of the rotation signal generated from the rotation signal generator of said rotation sensor and generating a rotational speed signal;

a source voltage detecting circuit connected to the power source for detecting electric potential of the power source and converting said electric potential into a voltage signal;

an integrated circuit means with a capacitor and a resistor for integrating source voltage supplied thereto and for generating a voltage signal having a predetermined time constant TO and voltage level in proportion to the level of the source voltage, time constant TO being selected nearly equal to the time function of the rotational speed of said electric motor; and a motor torque calculating means for calculating amended torque data of the electric motor according to the voltage signal supplied from said integrating circuit means and to the rotational speed signal of the electric motor supplied from said motor speed calculating means, and for supplying a descending demand signal to said drive controlling means to lower the window glass at the time when the amended torque data of the electric motor increases over a predetermined criterion value while said drive controlling means operates in response to the ascending command signal generated from said CLOSE-switch.

* * * * *

UNITED STATES PATENT AND TRADEMARK OFFICE
CERTIFICATE OF CORRECTION

| | | |
|---|---|---|
| PATENT NO. | : 6,426,604 B1 | |
| APPLICATION NO. | : 09/575452 | |
| DATED | : July 30, 2002 | |
| INVENTOR(S) | : Takeshi Ito and Masaru Kato | |

It is certified that error appears in the above-identified patent and that said Letters Patent is hereby corrected as shown below:

Claim 1, column 17, line 20, change "a CLOSE-switch" to --an OPEN-switch--.

Claim 1, column 17, line 23, change "an OPEN-switch" to --a CLOSE-switch--.

Claim 1, column 17, lines 42-44, change "for generating for generating" to --for generating--.

Claim 2, column 18, line 9, change "a CLOSE-switch" to --an OPEN-switch--.

Claim 2, column 18, line 12, change "an OPEN-switch" to --a CLOSE-switch--.

Claim 3, column 18, line 65, change "a CLOSE-switch" to --an OPEN-switch--.

Claim 3, column 19, line 1, change "an OPEN-switch" to --a CLOSE-switch--.

Signed and Sealed this

Twenty-seventh Day of March, 2007

JON W. DUDAS
*Director of the United States Patent and Trademark Office*